(12) United States Patent
Dehnke et al.

(10) Patent No.: US 12,642,183 B2

(45) Date of Patent: Jun. 2, 2026

(54) DUAL ROTOR CROP LOAD SYSTEM AND METHOD

(71) Applicant: DEERE & COMPANY, Moline, IL (US)

(72) Inventors: Jason R. Dehnke, Milan, IL (US); Logan K. Trueblood, Port Byron, IL (US); Derek J. Franke, Monroeville, IN (US); Nicholas J. Keener, Geneseo, IL (US)

(73) Assignee: Deere & Company, Moline, IL (US)

( * ) Notice: Subject to any disclaimer, the term of this patent is extended or adjusted under 35 U.S.C. 154(b) by 397 days.

(21) Appl. No.: 18/210,944

(22) Filed: Jun. 16, 2023

(65) Prior Publication Data

US 2024/0138318 A1     May 2, 2024

Related U.S. Application Data

(60) Provisional application No. 63/419,887, filed on Oct. 27, 2022.

(51) Int. Cl.
A01F 12/26     (2006.01)
A01F 12/50     (2006.01)

(52) U.S. Cl.
CPC .............. A01F 12/26 (2013.01); A01F 12/50 (2013.01)

(58) Field of Classification Search
CPC ................................. A01F 12/26; A01F 12/50
See application file for complete search history.

(56) References Cited

U.S. PATENT DOCUMENTS

| | | | |
|---|---|---|---|
| 3,606,742 A | | 9/1971 | Wieneke et al. |
| 4,893,241 A | | 1/1990 | Girodat et al. |
| 5,957,773 A | * | 9/1999 | Olmsted ............ A01D 41/1208 |
| | | | 460/149 |
| 6,213,870 B1 | | 4/2001 | Satzler |
| 6,517,431 B2 | * | 2/2003 | Schwersmann ........... A01F 7/06 |
| | | | 460/69 |
| 2016/0081271 A1 | | 3/2016 | Mott et al. |
| 2016/0120127 A1 | | 5/2016 | Mackin et al. |
| 2018/0343798 A1 | * | 12/2018 | Duquesne ............... A01F 7/067 |
| 2021/0068344 A1 | * | 3/2021 | Biggerstaff ............. A01F 12/26 |
| 2022/0125032 A1 | | 4/2022 | Ascherl |

FOREIGN PATENT DOCUMENTS

WO     WO22076675 A1     4/2022

\* cited by examiner

*Primary Examiner* — Cathleen R Hutchins

(74) *Attorney, Agent, or Firm* — Taft Stettinius & Hollister LLP; Stephen F. Rost

(57) ABSTRACT

An agricultural machine includes a first threshing rotor and a second threshing rotor positioned adjacent to the first threshing rotor. Each threshing rotor is configured to rotate to process harvested crop. The agricultural machine includes first and second sensors configured to measure a parameter indicative of crop load on the first threshing rotor and on the second threshing rotor, respectively. The agricultural machine includes a controller configured to change distribution of harvested crop in the agricultural machine based on a comparison between the measured parameter received from the first sensor and the measured parameter received from the second sensor.

18 Claims, 15 Drawing Sheets

500

512

228,328,428,1228,1428

502

504

506

508

516

514

DUAL ROTOR CROP LOAD SYSTEM AND METHOD

RELATED DISCLOSURES

This application claims priority to U.S. Provisional Application Ser. No. 63/419,887, filed Oct. 27, 2022, the disclosure of which is hereby incorporated by reference in its entirety.

FIELD OF THE DISCLOSURE

The present disclosure relates to agricultural machines for harvesting crop and, in particular, to systems and methods for directing harvested crop, for example, to rotors of a dual rotor threshing assembly of the agricultural machine.

BACKGROUND OF THE DISCLOSURE

Many work machines for harvesting crop utilize a dual rotor threshing assembly to separate grain or the like from the remaining plant debris such as leaves, stalks, and stems. The dual rotor threshing assembly may include two rotor assemblies. Each rotor assembly may include a rotor. As the rotors rotate, grain and debris positioned within the rotor assemblies are agitated and moved axially towards the rear of the rotor assemblies. As the rotors separate the grain from the remaining debris, the grain falls through grates or the like along lower portions of the rotor assemblies. Once the grain is separated, it is further processed and temporarily stored in a tank of the work machine.

SUMMARY

In an illustrative implementation, an agricultural machine for processing harvested crop includes: a dual rotor threshing assembly including a first threshing rotor and a second threshing rotor positioned adjacent to the first threshing rotor, wherein each of the first threshing rotor and the second threshing rotor are configured to rotate to process the harvested crop; a first sensor and a second sensor each configured to measure a parameter indicative of crop load; and a controller operatively coupled to the first sensor and the second sensor and configured to receive signals from the first sensor and the second sensor associated with the measured parameter. In some implementations, the first sensor is configured to measure the parameter indicative of crop load of the first threshing rotor and the second sensor is configured to measure the parameter indicative of crop load of the second threshing rotor. In some implementations, the controller is configured to determine whether one of the first threshing rotor and the second threshing rotor has a lesser crop load than the other of the first threshing rotor and the second threshing rotor based on the signals associated with the measured parameter received from the first sensor and the second sensor.

In some implementations, the agricultural machine further includes a frame to which the first threshing rotor and the second threshing rotor are coupled; the first threshing rotor and the second threshing rotor are configured to rotate relative to the frame to process the harvested crop.

In some implementations, the first sensor and the second sensor are configured to measure strain on the frame. In some implementations, the first threshing rotor is coupled to a laterally extending crossbar of the frame via a first bearing that facilitates rotation of the first threshing rotor about a first axis; the second threshing rotor is coupled to the laterally extending crossbar of the frame via a second bearing that facilitates rotation of the second threshing rotor about a second axis; the first sensor is coupled to the laterally extending crossbar and aligned with the first axis; and the second sensor is coupled to the laterally extending crossbar and aligned with the second axis.

In some implementations, the agricultural machine further includes: a guide drum configured to rotate relative to the frame to direct harvested crop to the first threshing rotor and the second threshing rotor; the guide drum is coupled between a first bracket of the frame and a second bracket of the frame. In some implementations, the first sensor is coupled to the first bracket and the second sensor is coupled to the second bracket.

In some implementations, the agricultural machine further includes a threshing basket including: a first side movable relative to the first threshing rotor and configured to process the harvested crop in cooperation with the first threshing rotor; and a second side movable, independently of the first side, relative to the second threshing rotor and configured to process the harvested crop in cooperation with the second threshing rotor.

In some implementations, the agricultural machine further includes a first cylinder assembly that is coupled to the frame, coupled to the first side of the thresher basket, and configured to extend and retract with movement of the first side of the thresher basket; a second cylinder assembly that is coupled to the frame, coupled to the second side of the thresher basket, and configured to extend and retract with movement of the second side of the thresher basket; and the first sensor is configured to measure pressure in a first cylinder assembly and the second sensor is configured to measure pressure in a second cylinder assembly.

In some implementations, the agricultural machine further includes a third sensor configured to measure pressure in a third cylinder assembly and a fourth sensor configured to measure pressure in a fourth cylinder assembly; the third cylinder assembly is positioned rearward of the first cylinder assembly and includes a first end coupled to the frame and a second end coupled to the first side of the thresher basket for movement therewith; the fourth cylinder assembly is positioned rearward of the second cylinder assembly and includes a first end coupled to the frame and a second end coupled to the second side of the thresher basket for movement therewith; and the controller is configured to determine whether one of the first threshing rotor and the second threshing rotor has a lesser crop load than the other of the first threshing rotor and the second threshing rotor based on measured pressures received from each of the first sensor, the second sensor, the third sensor, and the fourth sensor.

In some implementations, the controller is configured to compare a combination of the measured pressures received from the first cylinder and the third cylinder to a combination of the measured pressures received from the second cylinder and the fourth cylinder to determine whether one of the first threshing rotor and the second threshing rotor has a lesser crop load than the other of the first threshing rotor and the second threshing rotor.

In some implementations, the first sensor is configured to measure a position or change in position of the first side of the thresher basket relative to the first threshing rotor; and the second sensor is configured to measure a position or change in position of the second side of thresher basket relative to the second threshing rotor. In some implementations, at least one of the first sensor and the second sensor is a potentiometer.

In some implementations, the controller is configured to change a distribution of harvested crop between the first threshing rotor and the second threshing rotor in response to determining that one of the first threshing rotor and the second threshing rotor has a lesser crop load than the other of the first threshing rotor and the second threshing rotor. In some implementations, the controller is configured to cause movement of a deflector that engages with the harvested crop in response to determining that one of the first threshing rotor and the second threshing rotor has a lesser crop load than the other of the first threshing rotor and the second threshing rotor. In some implementations, the deflector is positioned upstream of the first threshing rotor and the second threshing rotor.

In another illustrative implementation, a method associated with processing harvested crop via an agricultural machine includes: rotating a first threshing rotor and a second threshing rotor positioned adjacent to the first threshing rotor to process the harvested crop; measuring, via a first sensor, a parameter indicative of crop load on the first threshing rotor; measuring, via a second sensor, the parameter indicative of crop load on the second threshing rotor; receiving, via the controller, the measured parameter from the first sensor and the measured parameter from the second sensor; and determining, via the controller, whether one of the first threshing rotor and the second threshing rotor has a lesser crop load than the other of the first threshing rotor and the second threshing rotor based on the measured parameter received from the first sensor and from the second sensor.

In some implementations, measuring the parameter indicative of the crop load includes measuring pressure. In some implementations, measuring the parameter indicative of the crop load includes measuring strain. In some implementations, measuring the parameter indicative of the crop load includes measuring a position or change in position of first and second sides of a thresher basket that cooperates with the first threshing rotor and the second threshing rotor to process the harvested crop.

In some implementations, the method further includes changing a distribution of harvested crop between the first threshing rotor and the second threshing rotor in response to determining that one of the first threshing rotor and the second threshing rotor has a lesser crop load than the other of the first threshing rotor and the second threshing rotor.

In another illustrative implementation, an agricultural machine for processing harvested crop includes: a dual rotor threshing assembly including a first threshing rotor and a second threshing rotor positioned adjacent to the first threshing rotor, wherein each of the first threshing rotor and the second threshing rotor are configured to rotate relative to a frame to process the harvested crop; a guide drum configured to rotate relative to the frame to direct harvested crop downstream to the first threshing rotor and the second threshing rotor; a first sensor and a second sensor each configured to measure a parameter indicative of crop load; and a controller operatively coupled to the first sensor and the second sensor and configured to receive signals from the first sensor and the second sensor associated with the measured parameter. In some implementations, the first sensor is configured to measure the parameter indicative of crop load of the first threshing rotor and the second sensor is configured to measure the parameter indicative of crop load of the second threshing rotor. In some implementations, the controller is configured to change a distribution of harvested crop based on the signals associated with the measured parameter received from the first sensor and the second sensor.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein:

FIG. 6 shows actuators that may be operatively coupled to the controller and configured move respective deflectors that direct harvested crop to the first threshing rotor and the second threshing rotor;

5

6

Figure 9:
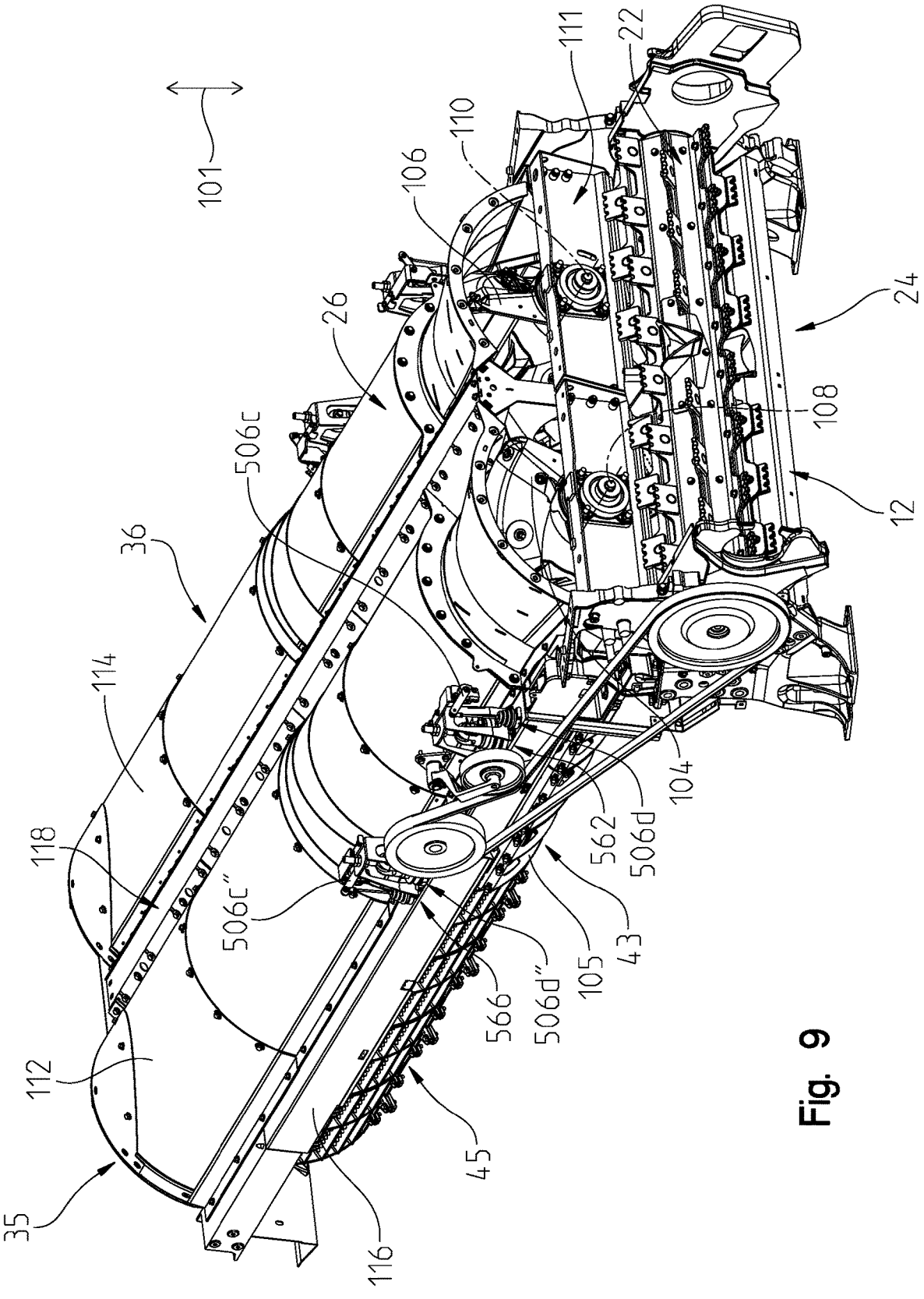
FIG. 9 is a front perspective view of a dual rotor threshing assembly and a guide drum that is configured to direct harvested crop to first and second threshing rotors of the dual rotor threshing assembly.
Figure 13:
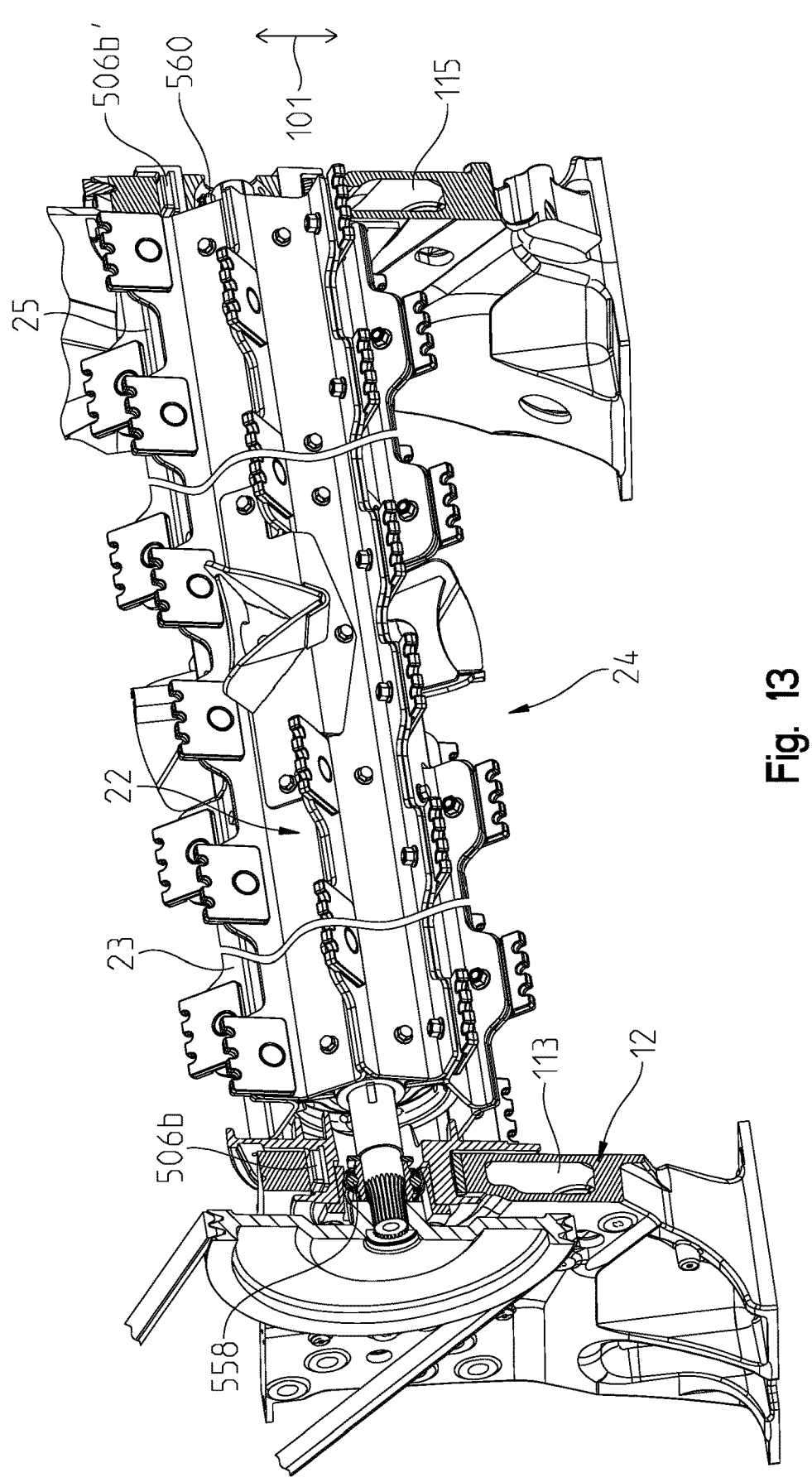
Figure 14:
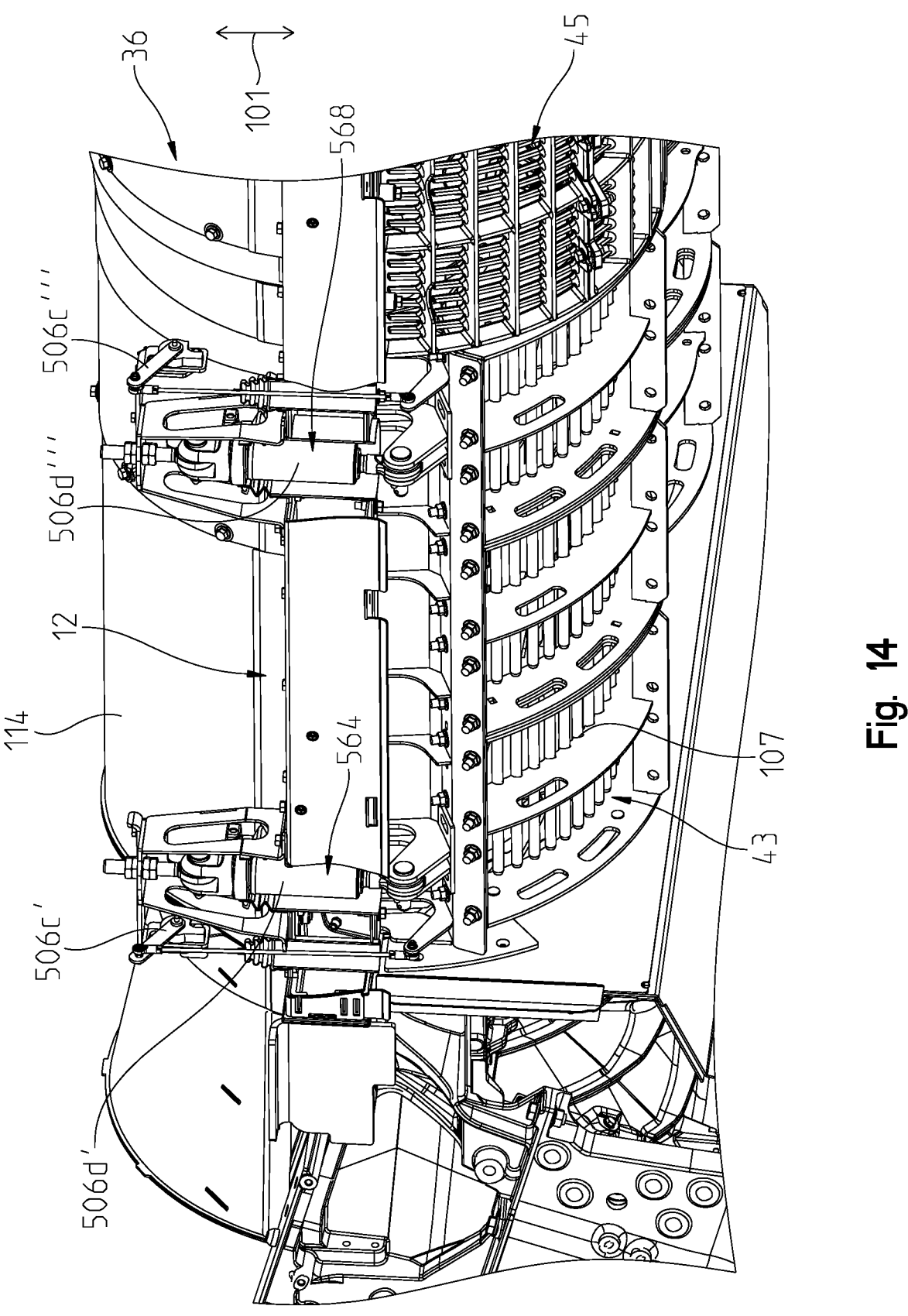

FIG. 13 is a front perspective and partial cross section view of the guide drum and a portion of the frame of FIG. 9, which shows first and second sensors coupled to the frame; and FIG. 14 is a perspective view of a portion of one side of the dual rotor threshing assembly, showing pressurized cylinder assemblies and position sensors associated with movement of one side of a thresher basket relative to a threshing rotor.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
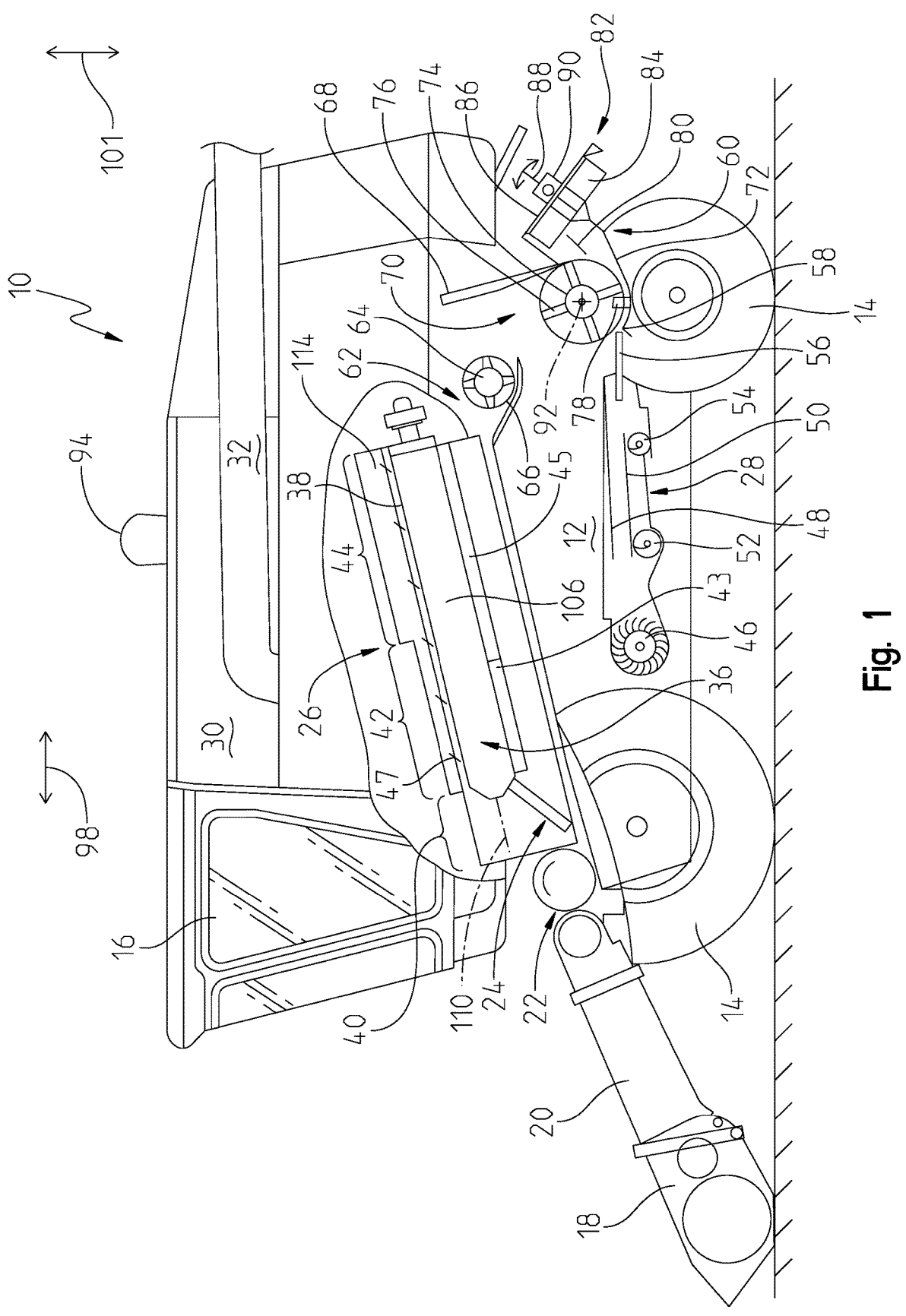
FIG. 1 is a side view of an agricultural machine configured to harvest and process crop.

In FIG. 1, an implementation of an agricultural machine 10 is shown. The agricultural machine 10 includes a frame 12 and one or more ground engaging mechanisms such as wheels 14 or tracks that are in contact with an underlying ground surface. In the illustrative implementation, the wheels 14 are coupled to the frame 12 and are used for propulsion of the agricultural machine 10 in a forward operating direction (which is to the left in FIG. 1) and in other directions. In some implementations, operation of the agricultural machine 10 is controlled from an operator's cab 16. The operator's cab 16 may include any number of controls for controlling the operation of the agricultural machine 10 such as a user interface. In some implementations, operation of the agricultural machine 10 may be conducted by a human operator in the operator's cab 16, a remote human operator, or an automated system.

A cutting head 18 is disposed at a forward end of the agricultural machine 10 and is used to harvest crop and to conduct harvested crop to a slope conveyor 20. The term harvested crop as used herein includes grain (e.g., corn, wheat, soybeans, rice, oats) and material other than grain (MOG). The slope conveyor 20 conducts the harvested crop to a guide drum 22. The guide drum 22 rotates relative to the frame 12 to move the harvested crop below the guide drum 22 to an inlet 24 of a dual rotor threshing assembly 26, as shown in FIGS. 1 and 9-13. The dual rotor threshing assembly 26 includes a first threshing rotor assembly 35 having a first threshing rotor 104 and a second threshing rotor assembly 36 having a second threshing rotor 106. The second threshing rotor assembly 36 is shown in FIG. 1. In the illustrative implementation, the first threshing rotor assembly 35 and the second threshing rotor assembly 36 are identical, and therefore, references made to the rotor assembly 36 and the components thereof are equally applicable to the rotor assembly 35. The first threshing rotor 104 includes a drum 37 arranged along a first threshing axis 108, and the second threshing rotor 106 includes a drum 38 arranged along a second threshing axis 110.

The dual rotor threshing assembly 26 further includes a charging section 40, a threshing section 42, and a separating section 44. The charging section 40 is arranged at a front end of the dual rotor threshing assembly 26, the separating section 44 is arranged at a rear end of the dual rotor threshing assembly 26, and the threshing section 42 is arranged between the charging section 40 and the separating section

44. In the illustrative implementation, the dual rotor threshing assembly 26 further includes a thresher basket 43 and a separating grate 45.

In the illustrative implementation, the thresher basket 43 is positioned in the threshing section 42 below the first and second threshing rotors 104, 106. The thresher basket 43 cooperates with the first and second threshing rotors 104, 106 to process harvested crop, for example, by compressing the harvested crop to remove grain from MOG before the harvested crop is moved to the separating section 44. In the illustrative implementation, the separating grate 45 is positioned in the separating section 44 below the first and second threshing rotors 104, 106. The separating grate 45 cooperates with the first and second threshing rotors 104, 106 to process harvested crop, for example, by facilitating separation of the harvested crop to release grain from MOG.

In some implementations, the thresher basket 43 includes a first side 105 positioned adjacent to and below the first threshing rotor 104 and a second side 107 positioned adjacent to and below the second threshing rotor 106. The first side 105 of the thresher basket 43 cooperates with the first threshing rotor 104 to process harvested crop, and the second side 107 of the thresher basket 43 cooperates with the second threshing rotor 106 to process harvested crop. In some implementations, first side 105 and the second side 107 of the thresher basket 43 are movable independently from one another relative to the first threshing rotor 104 and the second threshing rotor 106, respectively.

Harvested crop falls through the thresher basket 43 and through the separating grate 45. The harvested crop may be directed to a clean crop routing assembly 28 with a blower 46 and sieves 48, 50 with louvers. The sieves 48, 50 can be oscillated in the fore-and-aft direction 98. The clean crop routing assembly 28 removes MOG and guides grain over a screw conveyor 52 to a grain elevator 94. The grain elevator 94 deposits the grain in a grain tank 30, as shown in FIG. 1. The grain in the grain tank 30 can be unloaded by an unloading screw conveyor 32 to a grain wagon, trailer, or truck, for example. Harvested crop remaining at a rear end of the sieve 50 is again transported to the dual rotor threshing assembly 26 by a screw conveyor 54. Harvested crop remaining at a rear end of the sieve 48 is conveyed by an oscillating sheet conveyor 56 to a lower inlet 58 of a crop debris routing assembly 60.

The aforementioned blower 46 produces air flow that carries portions of MOG (e.g., chaff and straw particles) downstream in the agricultural machine 10 and to the crop debris routing assembly 60. Straw is ejected through an outlet 62 of the dual rotor threshing assembly 26 and conducted to an ejection drum 64. The ejection drum 64 interacts with a sheet 66 arranged underneath the ejection drum 64 to move straw rearwardly. A wall 68 is located to the rear of the ejection drum 64 and guides the straw into an upper inlet 70 of the crop debris routing assembly 60.

The crop debris routing assembly 60 includes a chopper housing 72 and a chopper rotor 74 arranged in the chopper housing 72. The chopper rotor 74 rotates in a counterclockwise direction, for example, about a chopper axis 92. In the illustrative implementation, the chopper axis 92 extends in a lateral direction perpendicular to the fore-and-aft direction 98. The chopper rotor 74 includes a plurality of chopper knives 76 extending to a circumference of the chopper rotor 74. The crop debris routing assembly 60 further includes opposing knives 78 (one of which is shown in FIG. 1) that are coupled to the chopper housing 72. In some implementations, the opposing knives 78 may be spaced laterally apart from and interleaved with the chopper knives 76. The chopper knives 76 cooperate with the opposing knives 78 to chop the straw into smaller pieces.

Referring again to FIG. 1, in some implementations, one or more spreaders are provided downstream of an outlet 80 of the crop debris routing assembly 60. One spreader is shown in FIG. 1. The spreader 82 may include a number of impeller blades 84, each of which is connected to a disk 86 that rotates about central axis 88. The disk 86 may be rotatably driven by a hydraulic motor 90, for example, and rotation of the disk 86 rotates the impeller blades 84. Chopped straw is moved through the outlet 80 of the crop debris routing assembly 60 to the spreader 82. Rotation of the impeller blades 84 of the spreader 82 spreads the chopped straw as the chopped straw exits the agricultural machine 10.

While FIG. 1 illustrates one type of agricultural machine 10, the teachings of this disclosure are not limited to the specific machine shown and described herein with reference to FIG. 1. Rather, the teachings of this disclosure may be applied to any type of harvesting machine that utilizes more than one rotor assembly for processing harvested crop. The implementation of FIG. 1 is merely a non-exclusive example of an agricultural machine 10 within the scope of the present disclosure.

The first threshing rotor 104 and the second threshing rotor 106 are rotationally coupled to the frame 12 of the agricultural machine 10, for example, by any number of brackets, bearings, or the like. In some implementations, the first threshing rotor 104 and the second threshing rotor 106 are indirectly coupled to the frame 12. The first threshing rotor 104 is configured to rotate about the first threshing axis 108, and the second threshing rotor 106 is configured to rotate about the second threshing axis 110. In this configuration, harvested crop is received by the first threshing rotor assembly 35 and the second threshing rotor assembly 36 via the inlet 24 of the dual rotor threshing assembly 26. The agricultural machine 10 may selectively rotate the first threshing rotor 104 and the second threshing rotor 106 via a mechanical linkage coupled to a prime mover, a hydraulic motor, an electric motor, a pneumatic motor, or any other system for rotating an assembly.

Figure 2:
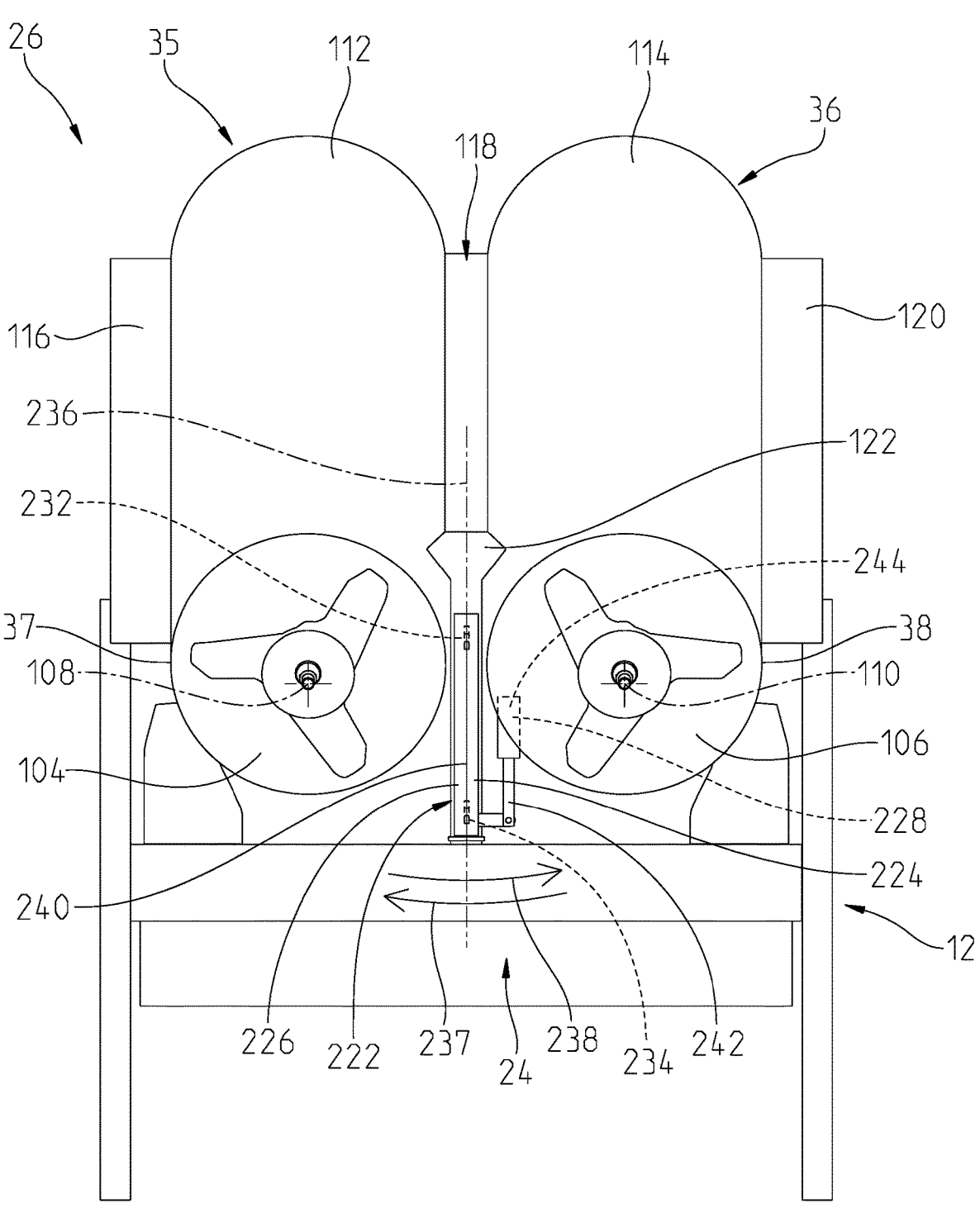
FIG. 2 is a semi-diagrammatic front perspective view of a dual rotor threshing assembly with a deflector configured to be pivoted to increase an amount of harvested crop directed to a first threshing rotor or a second threshing rotor depending on a direction of movement of the deflector.

In the illustrative implementation, the frame 12 includes a first cover 112, a second cover 114, a first side panel 116, a spine 118, and a second side panel 120. The spine 118 is positioned adjacent to and between the first threshing rotor 104 and the second threshing rotor 106. The spine 118 separates the first threshing rotor assembly 35 from the second threshing rotor assembly 36. The first cover 112 extends from the first side panel 116 to the spine 118, and the second cover 114 extends from the spine 118 to the second side panel 120. As illustrated in FIGS. 2 and 9, for example, the first cover 112 has an arc-shaped profile to form at least part of a cylindrical cavity of the first threshing rotor assembly 35 corresponding to a shape of the first threshing rotor 104, and the second cover 114 has an arc-shaped profile to form at least part of a cylindrical cavity of the second threshing rotor assembly 36 corresponding to a shape of the second threshing rotor 106.

As shown in FIG. 2, a deflector 222 is positioned at a forward end 122 of the spine 118 and laterally between the first threshing rotor 104 and the second threshing rotor 106. In the illustrative implementation, the deflector 222 is positioned upstream of the first threshing rotor 104 and the second threshing rotor 106. The deflector 222 is positioned downstream of the guide drum 22 to direct harvested crop received from the guide drum 22 toward each of the first threshing rotor 104 and the second threshing rotor 106. In the illustrative implementation, the deflector 222 is coupled to the spine 118. In some implementations, the deflector 222 is permanently coupled to the spine 118. In some implementations, the deflector 222 is removably coupled to the spine 118, for example, via fasteners.

As shown in FIG. 2, the deflector 222 is moveable relative to the frame 12. Movement of the deflector 222 alters an amount of harvested crop directed toward the first threshing rotor 104 and the second threshing rotor 106. For example, movement of the deflector 222 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 222, the deflector 222 remains positioned between the first threshing axis 108 and the second threshing axis 110.

Figure 3A:
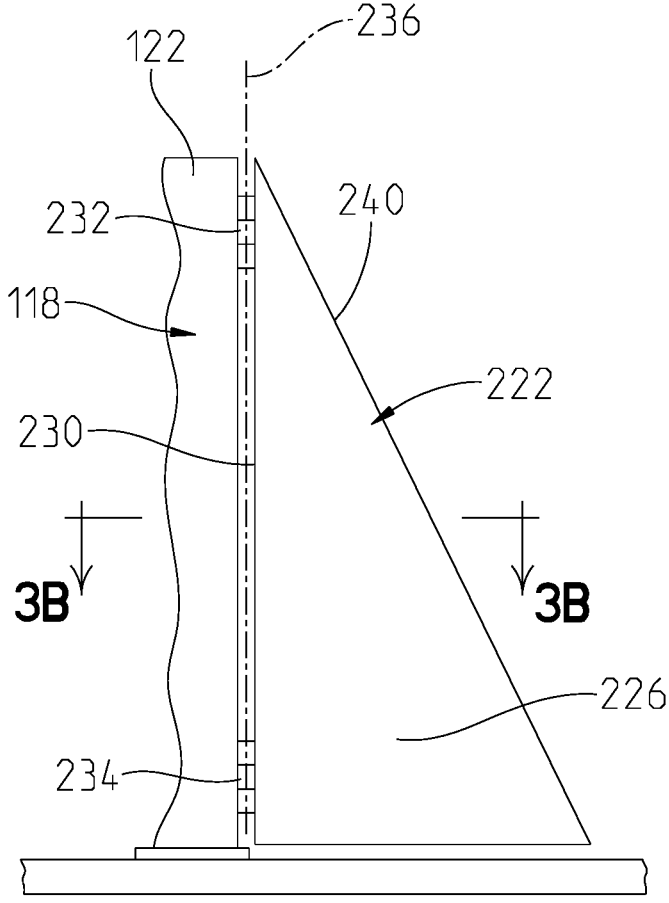
FIG. 3A is a side view of the deflector of FIG. 2 showing the deflector pivotably coupled to a spine separating the first threshing rotor and the second threshing rotor.
Figures 3B, 3C:
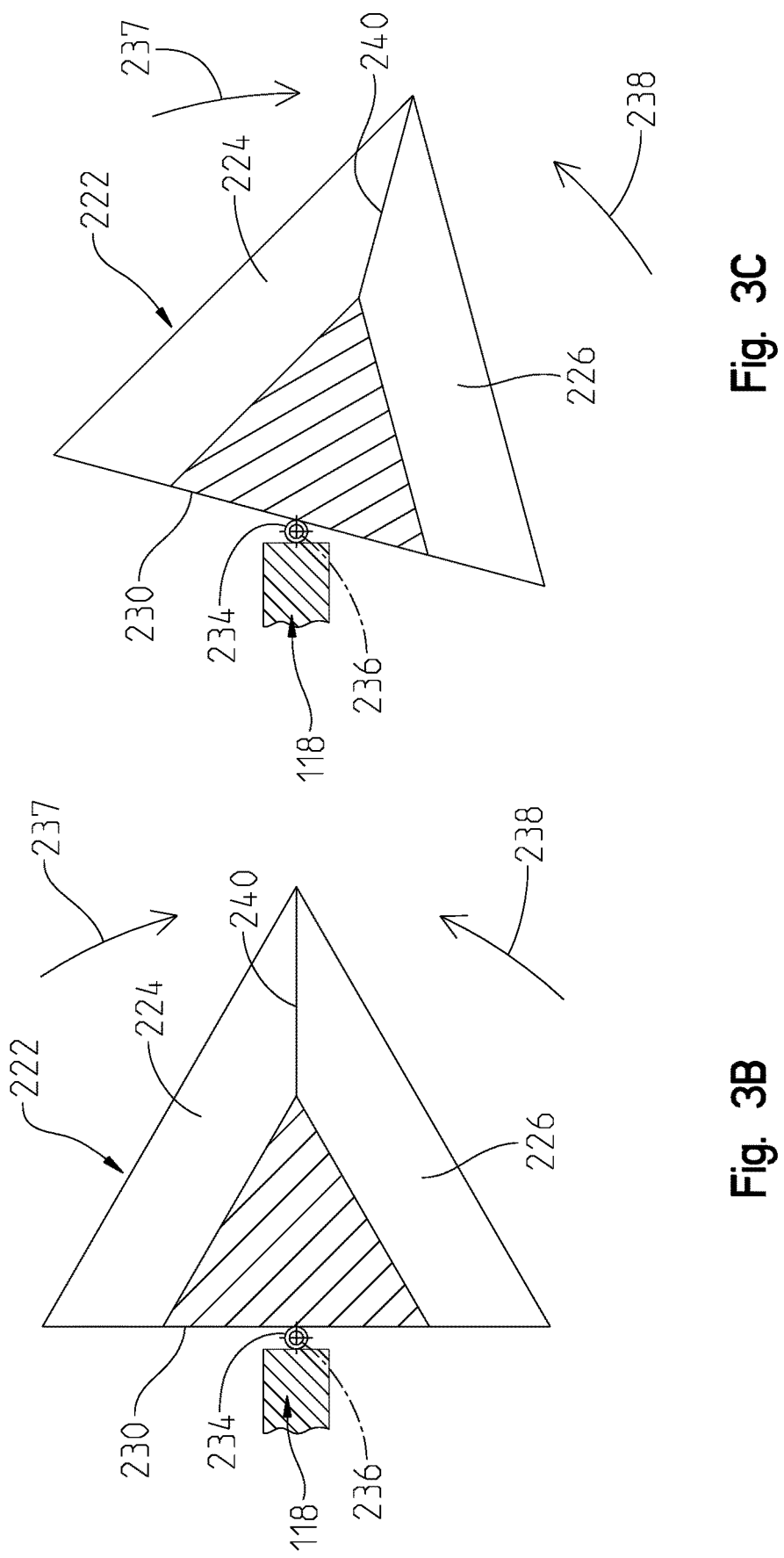
FIG. 3B is a top-down cross section view of the deflector of FIG. 2 showing a geometry of the deflector, in which the cross section is taken along the line indicated in FIG. 3A.
FIG. 3C is a top-down cross section view of the deflector of FIG. 2 showing the deflector pivoted relative to the view of the deflector shown in FIG. 3B.

As shown by FIG. 2, the deflector 222 is configured to pivot relative to the frame 12 about axis 236 in the directions of arrows 237, 238. The deflector 222 may also be described as pivotable relative to the spine 118 or pivotable relative to the first and second threshing rotors 104, 106. As shown in FIG. 3A, in one example, a rearward portion 230 of the deflector 222 may be pivotably coupled to the spine 118 via hinges 232, 234. As shown in FIGS. 3A, 3B, and 3C, the deflector 222 also includes a forward portion 240, a first side 224, and a second side 226. As shown in FIGS. 3B and 3C, the first side 224 and the second side 226 each extend outwardly (i.e., laterally) and rearwardly away from the forward portion 240. This geometry aids in directing harvested crop to the first threshing rotor 104 and the second threshing rotor 106. The forward portion 240 of the deflector 222 is pivotable toward the first threshing rotor 104 or the second threshing rotor 106. For example, FIG. 3B shows the deflector 222 aligned with the spine 118, and FIG. 3C shows the deflector 222 pivoted about the axis 236 in the direction of the arrow 237 toward the first threshing rotor 104.

Referring again to FIG. 2, in the illustrative implementation, an actuator 228 is coupled at a first end 242 to the first side 224 of the deflector 222 and at a second end 244 to the frame 12. In some implementations, the actuator 228 is indirectly coupled to the deflector 222 and indirectly coupled to the frame 12. While in FIG. 2 the actuator 228 is embodied as a linear actuator, the actuator 228 may also be a rotary actuator or any other type of actuator operable to pivot the deflector 222 relative to the frame 12 and the spine 118. The actuator 228 may be electric, hydraulic, pneumatic, or any other type operable to actuate the deflector 222.

Figure 4:
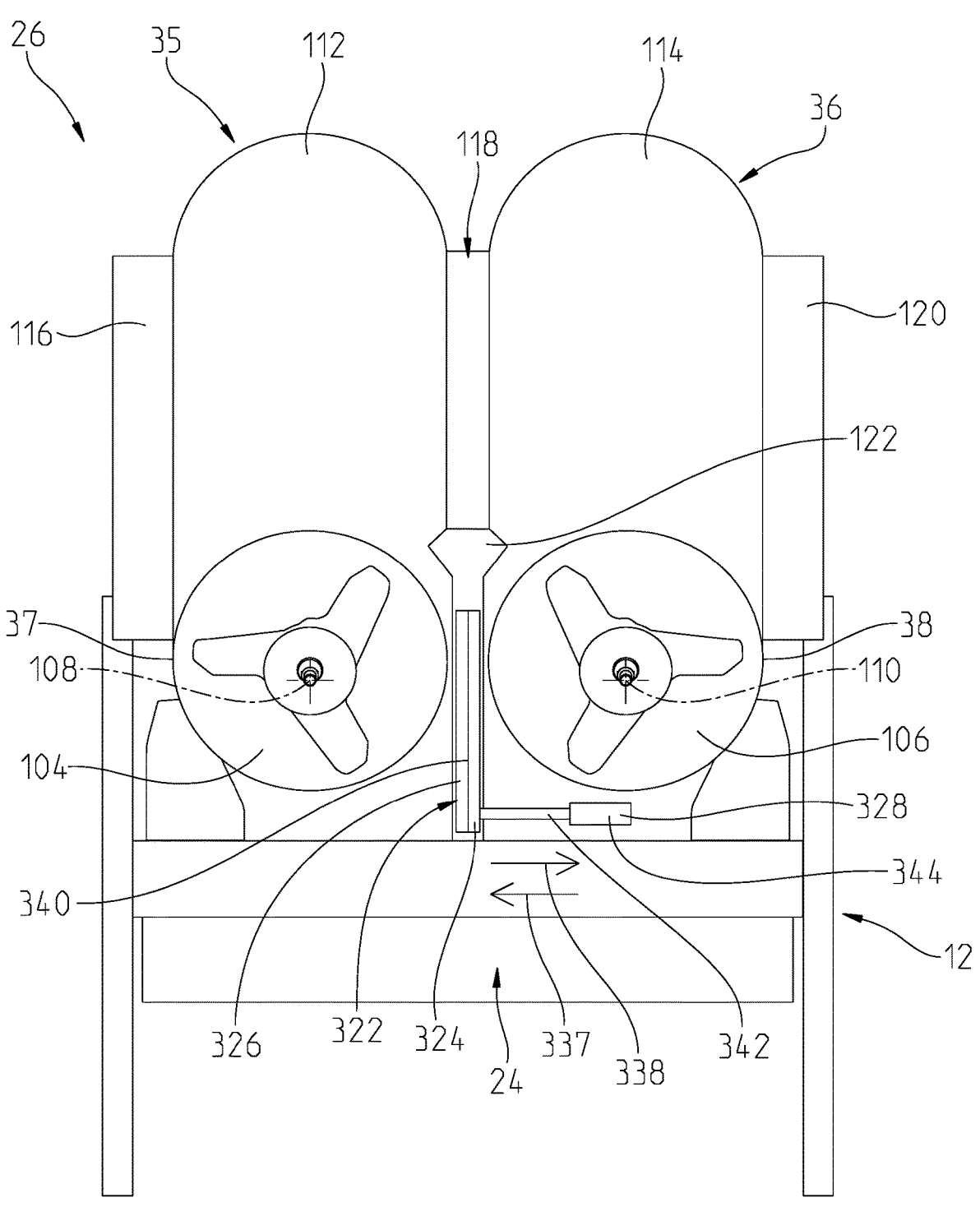
FIG. 4 is a semi-diagrammatic front perspective view of a dual rotor threshing assembly with a deflector configured to be slid to increase an amount of harvested crop directed to a first threshing rotor or a second threshing rotor depending on a direction of movement of the deflector.

FIG. 4 shows another implementation of the dual rotor threshing assembly 26, which includes a deflector 322. As shown in FIG. 4, the deflector 322 is positioned upstream of the first threshing rotor 104 and the second threshing rotor 106. The deflector 322 is moveable relative to the frame 12. Movement of the deflector 322 alters an amount of harvested crop directed to the first threshing rotor 104 and the second threshing rotor 106. For example, movement of the deflector 322 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 322, the deflector 322 remains positioned between the first threshing axis 108 and the second threshing axis 110. In some implementations, the deflector 222 is permanently coupled to the spine 118. In some implementations, the deflector 222 is removably coupled to the spine 118, for example, via fasteners.

As suggested by FIG. 4, the deflector 322 is configured to slide laterally relative to the frame 12 in the directions indicated by arrows 337, 338. The deflector 322 may also be described as slidable laterally relative to the spine 118 or relative to the first and second threshing rotors 104, 106. In an illustrative implementation, the deflector 322 may be slidably coupled to one or more laterally extending rails or channels that are fixed relative to the frame 12. In the illustrative implementation, the deflector 322 includes a forward portion 340, a first side 324, and a second side 326. The first side 324 and the second side 326 each extend outwardly (i.e., laterally) and rearwardly away from the forward portion 340. Thus, in the illustrative implementation, the deflector 322 has the same shape as the deflector 222, which is shown in FIGS. 3A, 3B, and 3C. This geometry aids in directing harvested crop to the first threshing rotor 104 and the second threshing rotor 106.

In the illustrative implementation, an actuator 328 is coupled at a first end 342 to the first side 324 of the deflector 322 and at a second end 344 to the frame 12. In some implementations, the actuator 328 is indirectly coupled to the deflector 322 and the frame 12. While in FIG. 4 the actuator 328 is embodied as a linear actuator, in other instances, the actuator 328 may be a rotary actuator or any other type of actuator operable to slide the deflector 322 relative to the frame 12 and the spine 118. The actuator 328 may be electric, hydraulic, pneumatic, or any other type operable to actuate the deflector 322.

Figure 5:
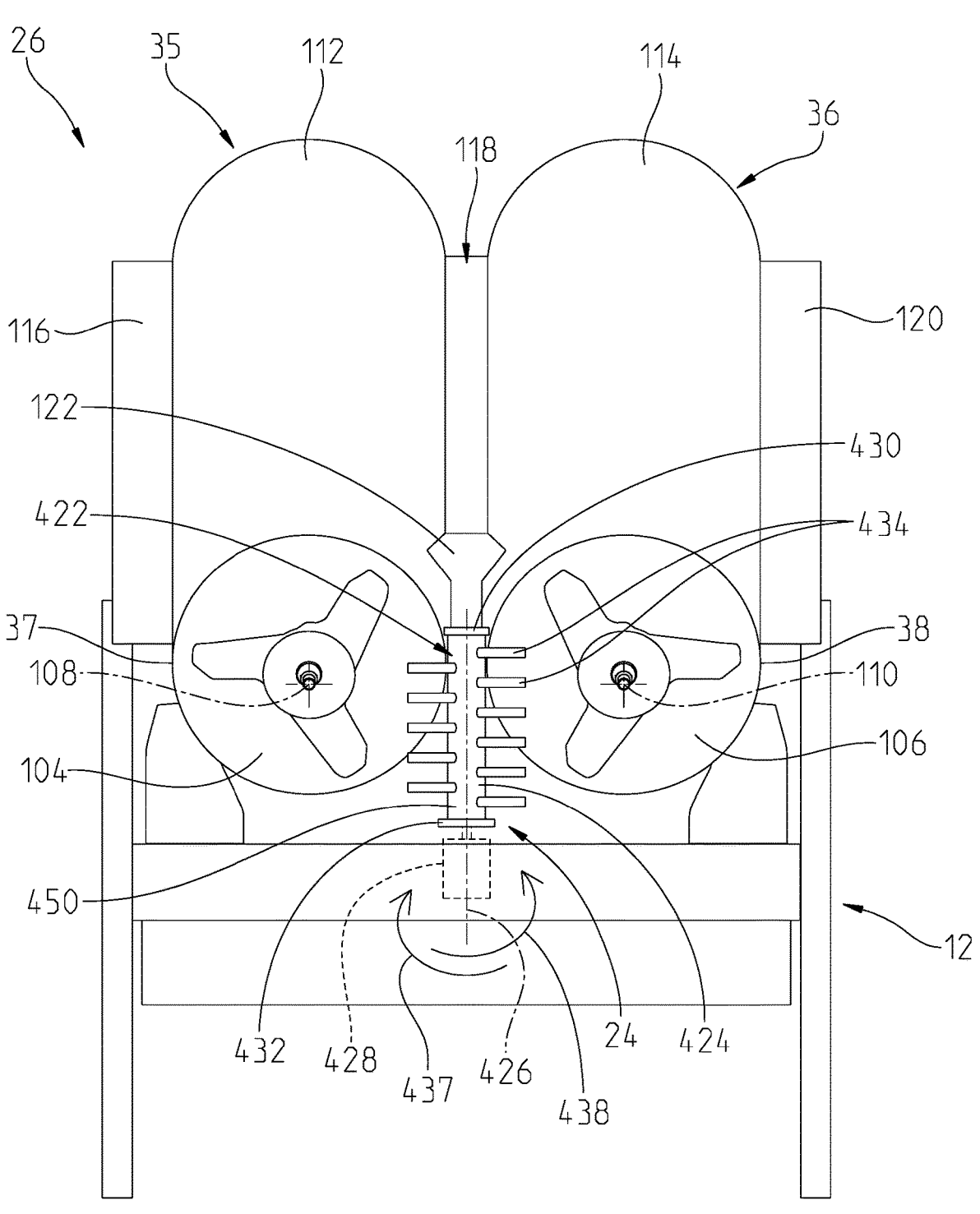
FIG. 5 is a semi-diagrammatic front perspective view of a dual rotor threshing assembly with a deflector configured to be rotated to increase an amount of harvested crop directed to a first threshing rotor or a second threshing rotor depending on a direction of movement of the deflector.

FIG. 5 shows another implementation of the dual rotor threshing assembly 26, which includes a deflector 422. As shown, at least a portion of the deflector 422 is positioned upstream of the first threshing rotor 104 and the second threshing rotor 106. The deflector 422 is moveable relative to the frame 12. Movement of the deflector 422 alters an amount of harvested crop directed toward the first threshing rotor 104 and the second threshing rotor 106. For example, movement of the deflector 422 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 422, the deflector 422 remains positioned between the first threshing axis 108 and the second threshing axis 110. In some implementations, the deflector 422 is permanently coupled to the spine 118. In other implementations, the deflector 422 is removably coupled to the spine 118, for example, via fasteners.

As suggested by FIG. 5, the deflector 422 is configured to rotate clockwise in the direction of arrow 437 or counter-clockwise in the direction of arrow 438 about a rotational axis 426 relative to the frame 12. The deflector 422 may also be described as rotatable clockwise or counter-clockwise relative to the spine 118 or the first and second threshing rotors 104, 106. As used herein, a component configured to be rotated is configured to move 360 degrees about an axis, and a component configured to be pivoted is configured to move less than 360 degrees about an axis.

In an illustrative implementation, the deflector 422 may be rotatably coupled to the frame 12 (e.g., to the spine 118) via bearings 430, 432. In the illustrative implementation, the deflector 422 includes a body portion 424, which may be cylindrical. The deflector 422 may also include a plurality of protrusions, indents, or other features forming a texture surface of the deflector 422 for better contacting and directing harvested crop. For example, the deflector 422 may include a plurality of fingers 434 extending outwardly from the body portion 424 and configured to contact and direct harvested crop. The fingers 434 aid in directing harvested crop to the first threshing rotor 104 and the second threshing rotor 106. The body portion 424 is defined about the rotational axis 426, about which the deflector 422 is configured to rotate. The rotational axis 426 is fixed relative to the frame 12, the spine 118, the first threshing rotor 104 and the second threshing rotor 106, and the threshing axes 108, 110. In the illustrative implementation, the deflector 422 is coupled, for example, at a first end 450 of the body portion 424, to an actuator 428. In some implementations, the actuator 428 is indirectly coupled to deflector 422 and the frame 12. In the illustrative implementation, the actuator 428 is embodied as a rotary actuator; however, in some implementations, the actuator 428 may be another type of actuator operable to rotate the deflector 422. The actuator 428 may be electric, hydraulic, pneumatic, or another type of actuator.

Figure 10:
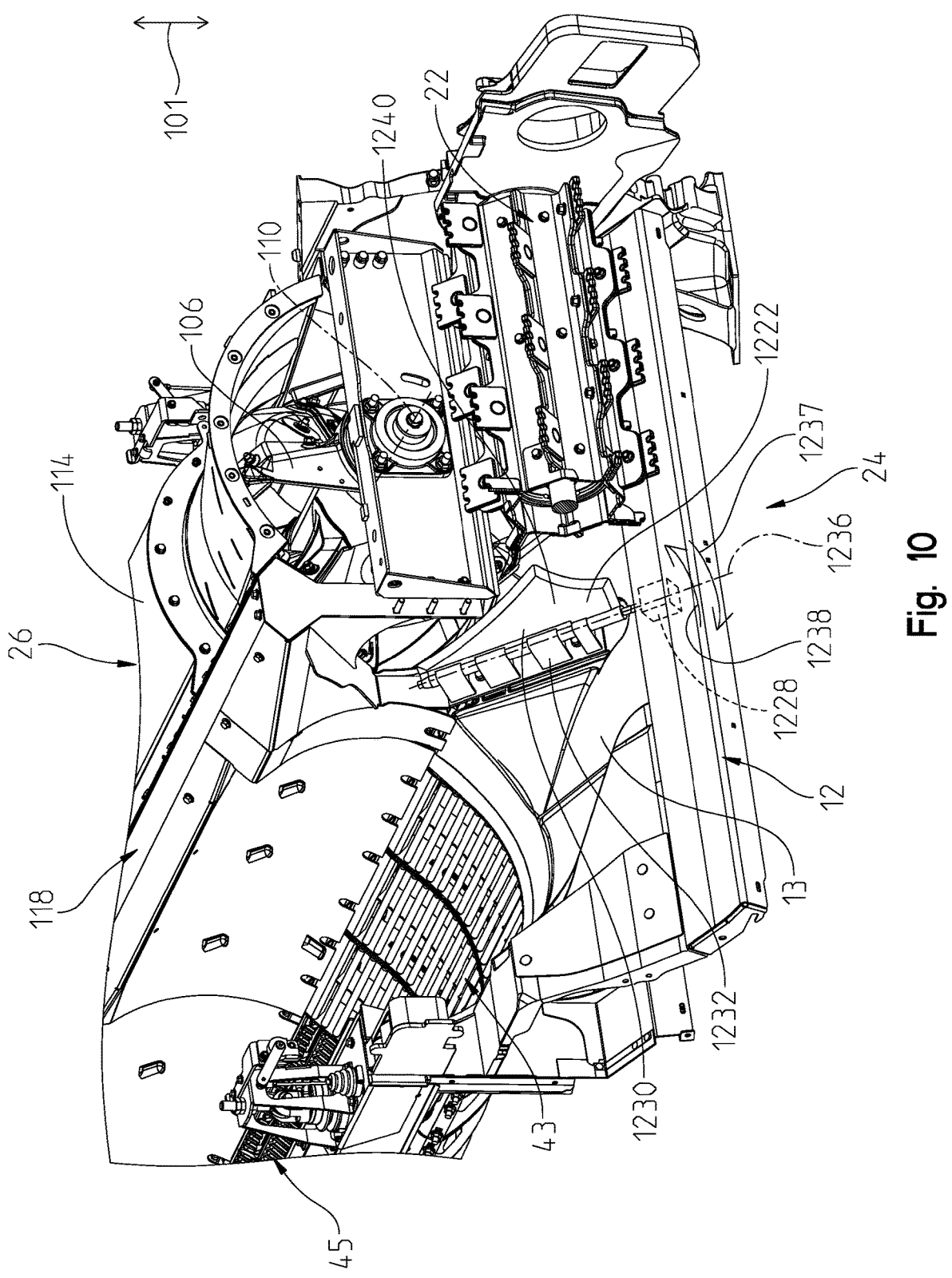
FIG. 10 is a front perspective view of another dual rotor threshing assembly with a deflector configured to be pivoted to increase an amount of harvested crop directed to a first threshing rotor or a second threshing rotor depending on a direction of movement of the deflector.

FIG. 10 shows another implementation of the dual rotor threshing assembly 26, which includes a deflector 1222. The deflector 1222 is positioned laterally between the first threshing rotor 104 and the second threshing rotor 106. In the illustrative implementation, the deflector 1222 is positioned upstream of the first threshing rotor 104 and the second threshing rotor 106. The deflector 1222 is positioned downstream of the guide drum 22, which extends in the lateral direction perpendicular to the first and second threshing axes 108, 110. The deflector 1222 is configured to direct harvested crop received from the guide drum 22 toward each of the first threshing rotor 104 and the second threshing rotor 106. In the illustrative implementation, the deflector 1222 is coupled to the frame 12 and indirectly coupled to the spine 118 of the frame 12. In some implementations, the deflector 1222 is permanently coupled to the frame 12. In some implementations, the deflector 1222 is removably coupled to the frame 12, for example, via fasteners.

As shown in FIG. 10, the deflector 1222 is moveable relative to the frame 12. Movement of the deflector 1222 alters an amount of harvested crop directed toward the first threshing rotor 104 and the second threshing rotor 106. For example, movement of the deflector 1222 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 1222, the deflector 1222 remains positioned between the first threshing axis 108 and the second threshing axis 110. As shown in FIG. 10, in some implementations, a majority of the deflector 1222 is positioned below the first threshing axis 108 and the second threshing axis 110. In some implementations, an entirety of the deflector 1222 is positioned below the first threshing axis 108 and the second threshing axis 110. The terms above and below, are used herein with reference to the vertical direction 101, which is shown by the double sided arrow in FIGS. 1 and 10-11.

As shown in FIG. 10, the deflector 1222 is configured to pivot relative to the frame 12 about an axis 1236 in the directions of arrows 1237, 1238. The deflector 1222 may also be described as pivotable relative to the spine 118 or pivotable relative to the first and second threshing rotors 104, 106. As shown in FIG. 10, a rearward portion 1230 of the deflector 1222 may be pivotably coupled to the frame 12 via a hinge 1232. In the illustrative implementation, the frame 12 includes a floor 13 over which harvested crop passes, and the deflector 1222 is pivotably coupled to the floor 13 of the frame 12. As shown in FIG. 10, in the illustrative implementation, the deflector 1222 is shaped to accommodate available space between the guide drum 22 and the first and second threshing rotors 104, 106. For example, in the illustrative implementation, the deflector 1222 includes a forward portion 1240 having a cut-out (for example, an arcuate cut-out), and a lower portion of the deflector 1222 has a great length than an upper portion of the deflector 1222.

Referring still to FIG. 10, in the illustrative implementation, an actuator 1228 is coupled to the deflector 1222 and to the frame 12. In the illustrative implementation, the actuator 1228 is embodied as a rotary actuator; however, in some implementations, the actuator 1228 may be another type of actuator operable to cause pivoting movement of the deflector 1222. The actuator 1228 may be electric, hydraulic, pneumatic, or another type of actuator.

Figure 11:
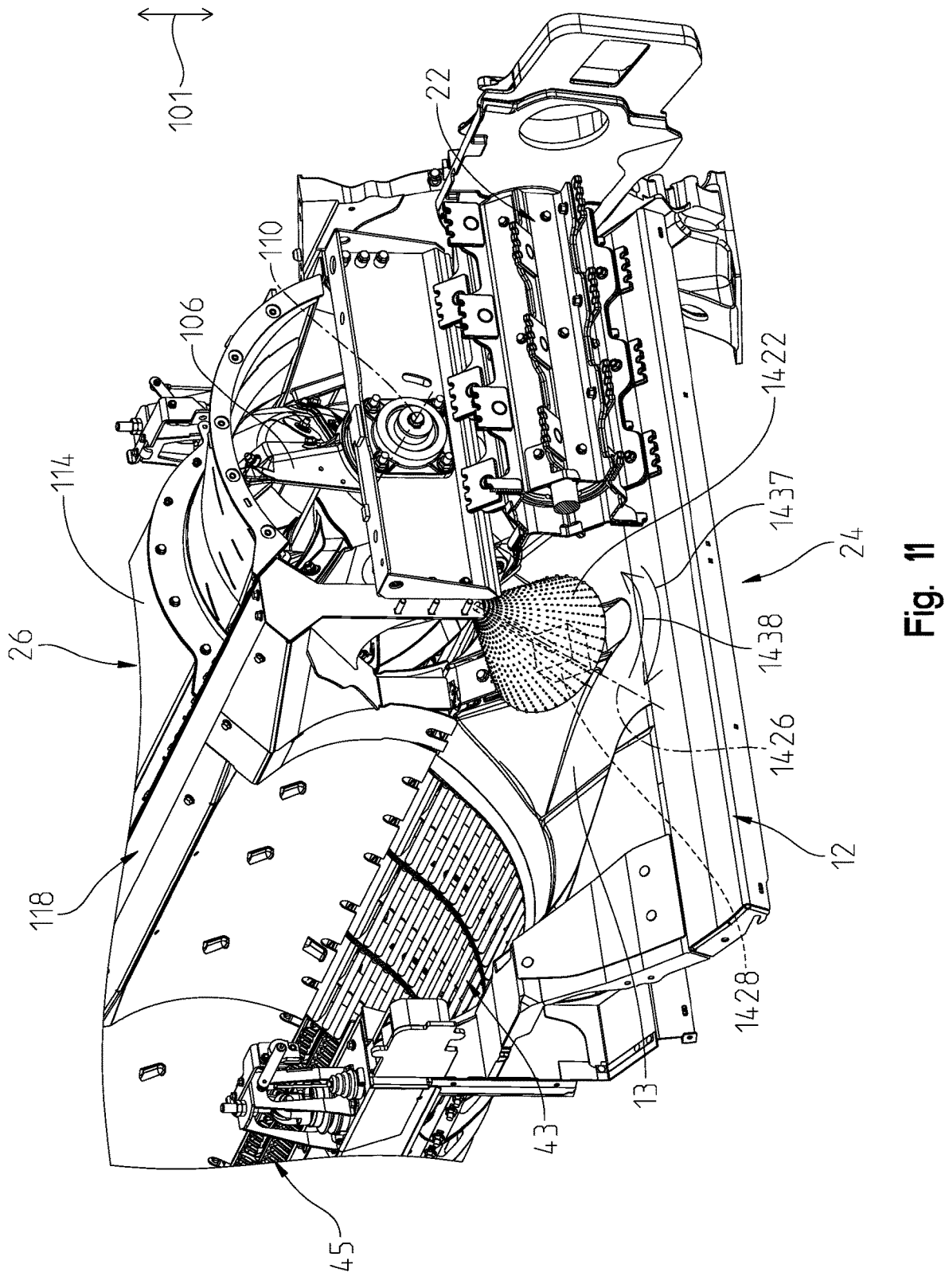
FIG. 11 is a front perspective view of another dual rotor threshing assembly with a deflector configured to be rotated to increase an amount of harvested crop directed to a first threshing rotor or a second threshing rotor depending on a direction of movement of the deflector.

FIG. 11 shows another implementation of the dual rotor threshing assembly 26, which includes a deflector 1422. The deflector 1422 is positioned laterally between the first threshing rotor 104 and the second threshing rotor 106. In the illustrative implementation, the deflector 1422 is positioned upstream of the first threshing rotor 104 and the second threshing rotor 106. The deflector 1422 is positioned downstream of the guide drum 22 and is configured to direct harvested crop received from the guide drum 22 toward each of the first threshing rotor 104 and the second threshing rotor 106.

As shown in FIG. 11, the deflector 1422 is moveable relative to the frame 12. Movement of the deflector 1422 alters an amount of harvested crop directed toward the first threshing rotor 104 and the second threshing rotor 106. For example, movement of the deflector 1422 increases the amount of harvested crop directed toward one of the first threshing rotor 104 and the second threshing rotor 106, and likewise, decreases the amount of harvested crop directed toward the other of the first threshing rotor 104 and the second threshing rotor 106. This is different than deflectors of conventional agricultural machines, which, all other variables being equal (e.g., tilt of the machine or crop intake at each side of the machine), tend to deflect harvested crop equally toward a first threshing rotor and a second threshing rotor. In the illustrative implementation, during movement of the deflector 1422, the deflector 1422 remains positioned between the first threshing axis 108 and the second threshing axis 110. In some implementations, a majority of the deflector 1422 is positioned below the first threshing axis 108 and the second threshing axis 110. In some implementations, an entirety of the deflector 1422 is positioned below the first threshing axis 108 and the second threshing axis 110.

As shown in FIG. 11, the deflector 1422 is configured to rotate clockwise in the direction of arrow 1437 or counterclockwise in the direction of arrow 1438 about a rotational axis 1426 relative to the frame 12. The deflector 422 may also be described as rotatable clockwise or counter-clockwise relative to the spine 118 or the first and second threshing rotors 104, 106. In the illustrative implementation, the frame 12 includes the floor 13 over which harvested crop passes, and the deflector 1422 is rotatably coupled to the floor 13 of the frame 12. As shown in FIG. 11, in the illustrative implementation, the deflector 1422 is shaped to accommodate available space between the guide drum 22 and the first and second threshing rotors 104, 106. For example, in the illustrative implementation, the deflector 1422 is conical and narrows from a top portion to a bottom portion.

In the illustrative implementation, the deflector 1422 includes a plurality of protrusions for contacting and directing harvested crop. In the illustrative implementation, the deflector 1422 is coupled (for example, at the bottom portion) to an actuator 1428. In the illustrative implementation, the actuator 1428 is embodied as a rotary actuator; however, in some implementations, the actuator 1428 may be another type of actuator operable to rotate the deflector 1422. The actuator 1428 may be electric, hydraulic, pneumatic, or another type of actuator.

While each of the deflectors 222, 322, 422, 1222, 1422 are positioned upstream of the first and second threshing rotors 104, 106, in some implementations, deflectors (such as those described herein) are positioned downstream of the first and second threshing rotors 104, 106. In some implementations, one or more deflectors positioned downstream of the first and second threshing rotors 104, 106 are coupled to and moveable relative to the frame 12 and engage with and direct harvested crop after the harvested crop is processed by the first and second threshing rotors 104, 106. In some implementations, the controller 502 is configured to cause movement of one or more deflectors positioned downstream of the first and second threshing rotors 104, 106 in response to determining that one of the first threshing rotor 104 and the second threshing rotor 106 has a lesser crop load than the other of the first threshing rotor 104 and the second threshing rotor 106.

Figure 6:
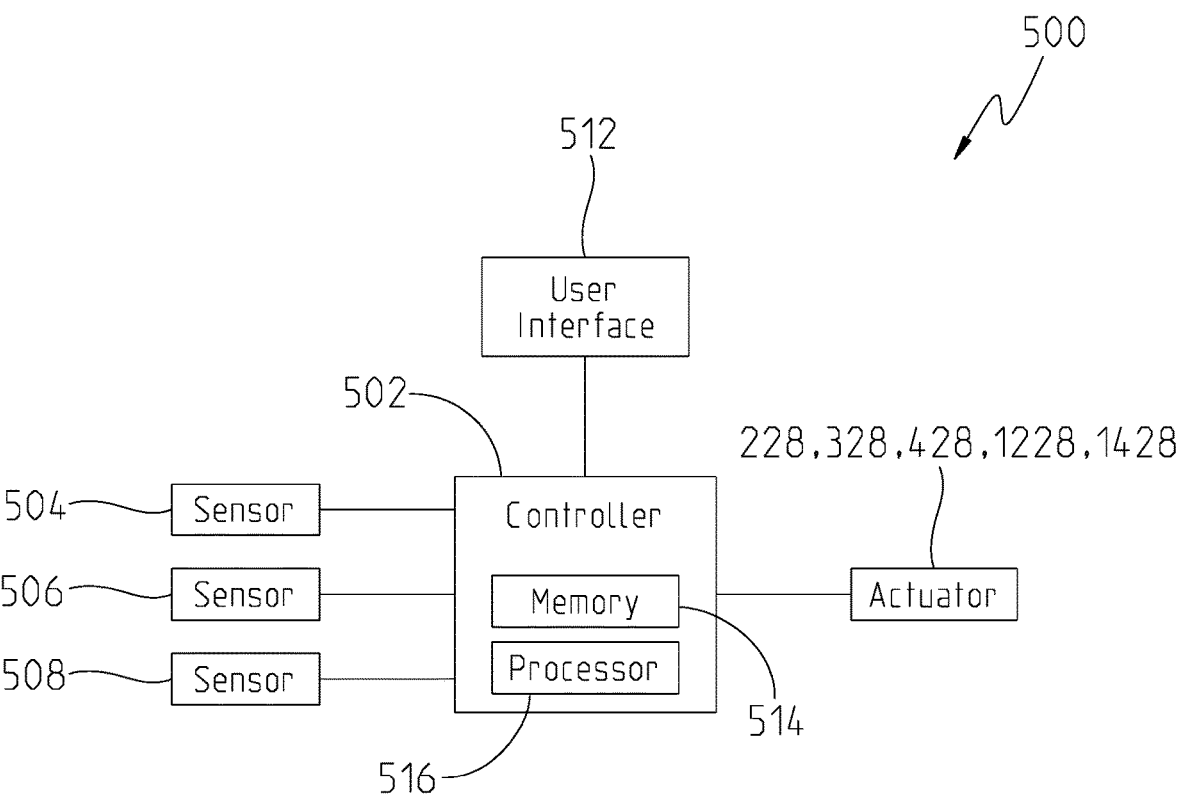
FIG. 6 is diagrammatic view of a control system for an agricultural machine showing a controller operatively coupled to at least one sensor configured to sense information associated with a first threshing rotor and a second threshing rotor.

As shown in FIG. 6, a control system 500 is usable to move the deflectors described herein. The control system 500 includes a controller 502, at least one actuator (e.g., actuators 228, 328, 428, 1228, 1428) that is operatively coupled to the controller 502, and at least one sensor (e.g., sensors 504, 506, 508) that is operatively coupled to the controller 502. The sensors are configured to send signals to the controller 502 that are used by the controller 502 to determine a direction of movement for the deflectors described herein. The control system 500 also includes a user interface 512 operatively coupled to the controller 502 and configured to send signals to the controller 502 indicative of information supplied to the user interface 512 by a user.

The control system 500 further includes one or more memories 514 included on or accessible by the controller 502 and one or more processors 516 included on or accessible by the controller 502. The one or more processors 516 are configured to execute instructions (i.e., one or more algorithms) stored on the one or more memories 514. The controller 502 may be a single controller or a plurality of controllers operatively coupled to one another. The controller 502 may be located on the agricultural machine 10 or positioned remotely, away from the agricultural machine 10. The controller 502 may be coupled via a wired connection or wirelessly to other components of the agricultural machine 10 and one or more remote devices. In some instances, the controller 502 may be connected wirelessly via Wi-Fi, Bluetooth, NFC or another wireless communication protocol. The user interface 512 is operatively coupled to the controller 502 and configured to send signals to the controller 502 indicative of information supplied to the user interface 512 by a user.

Figure 7:
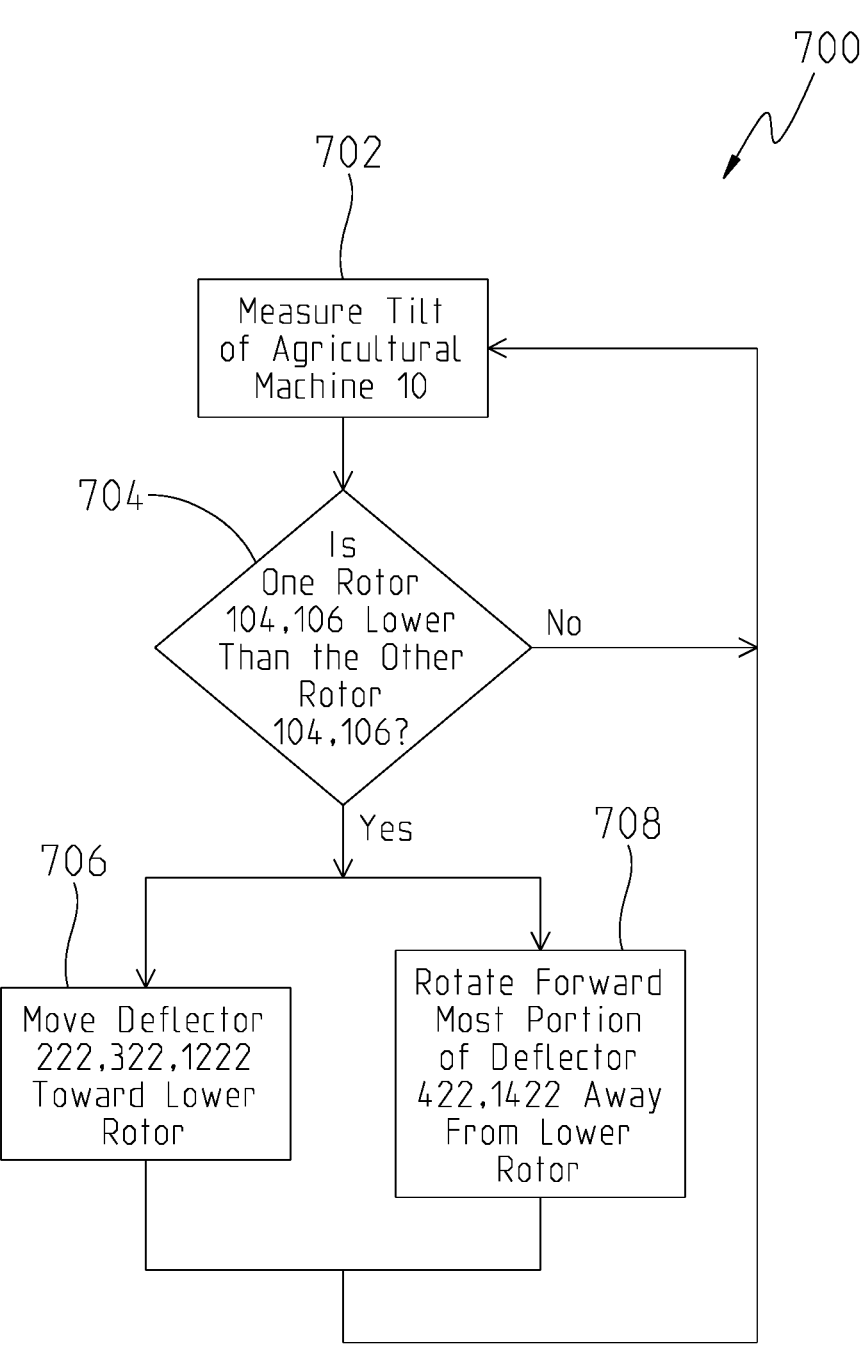
FIG. 7 is a flow chart of an example method of moving a deflector of an agricultural machine based on a measured tilt of the agricultural machine.

Referring now to FIG. 7, a method 700 is shown for controlling movement of a deflector of the agricultural machine 10. At 702, the sensor 504 measures an orientation of the agricultural machine 10. For example, as shown at step 702, the sensor 504 measures a tilt of the agricultural machine 10 relative to a surface (e.g., the ground surface) or the force of gravity. As the agricultural machine 10 tilts, one of the first threshing rotor 104 and the second threshing rotor 106 may be positioned higher than the other of the first threshing rotor 104 and the second threshing rotor 106. As a result, the rotor that is positioned lower intakes a greater amount of harvested crop than the rotor that is positioned higher. In use, the sensor 504 sends a signal to the controller 502 indicative of the measured tilt. In some implementations, at 704, the controller 502 determines whether one of the threshing rotors 104, 106 is positioned lower than the other threshing rotor 104, 106. As indicated by 706 and 708, the controller 502, adjusts the deflector (such as via actuation of one or more actuators operatively coupled to the controller 502), causing movement of the deflector such that additional harvested crop is directed toward the rotor located at the higher elevation. For example, as indicated at 706, if the first threshing rotor 104 is positioned lower than the second threshing rotor 106, then the controller 502 causes the actuator 228 or 1228 to pivot the deflector 222 or 1222 toward the first threshing rotor 104 to increase the amount of harvested crop directed to the second threshing rotor 106. In another example, as indicated at 706, if the first threshing rotor 104 is positioned lower than the second threshing rotor 106, then the controller 502 causes the actuator 328 to slide the deflector 322 toward the first threshing rotor 104 to increase the amount of harvested crop directed to the second threshing rotor 106.

In yet another example, as indicated at 708, if the first threshing rotor 104 is positioned lower than the second threshing rotor 106, then the controller 502 causes the actuator 428 to rotate a deflector 422 counter-clockwise in the direction of arrow 438, as shown in the context of FIG. 5, to increase the amount of harvested crop directed to the second threshing rotor 106. In other words, as indicated at 708, the controller 502 causes the actuator 428 to rotate the deflector 422 in a direction such that an increased amount of harvested crop is directed toward the higher-positioned rotor. In another example, as indicated at 708, if the first threshing rotor 104 is positioned lower than the second threshing rotor 106, then the controller 502 causes the actuator 1428 to rotate a deflector 1422 counter-clockwise in the direction of arrow 1438, as shown in the context of FIG. 11, to increase the amount of harvested crop directed to the second threshing rotor 106. In other words, as indicated at 708, the controller 502 causes the actuator 428, 1428 to rotate the deflector (e.g., 422, 1422) in a direction such that an increased amount of harvested crop is directed toward the higher-positioned threshing rotor.

In each of these examples, movement of the respective deflector 222, 322, 422, 1222, 1422 increases the amount of harvested crop directed toward the higher-positioned threshing rotor (104 or 106) of the dual rotor threshing assembly 26.

Figure 8:
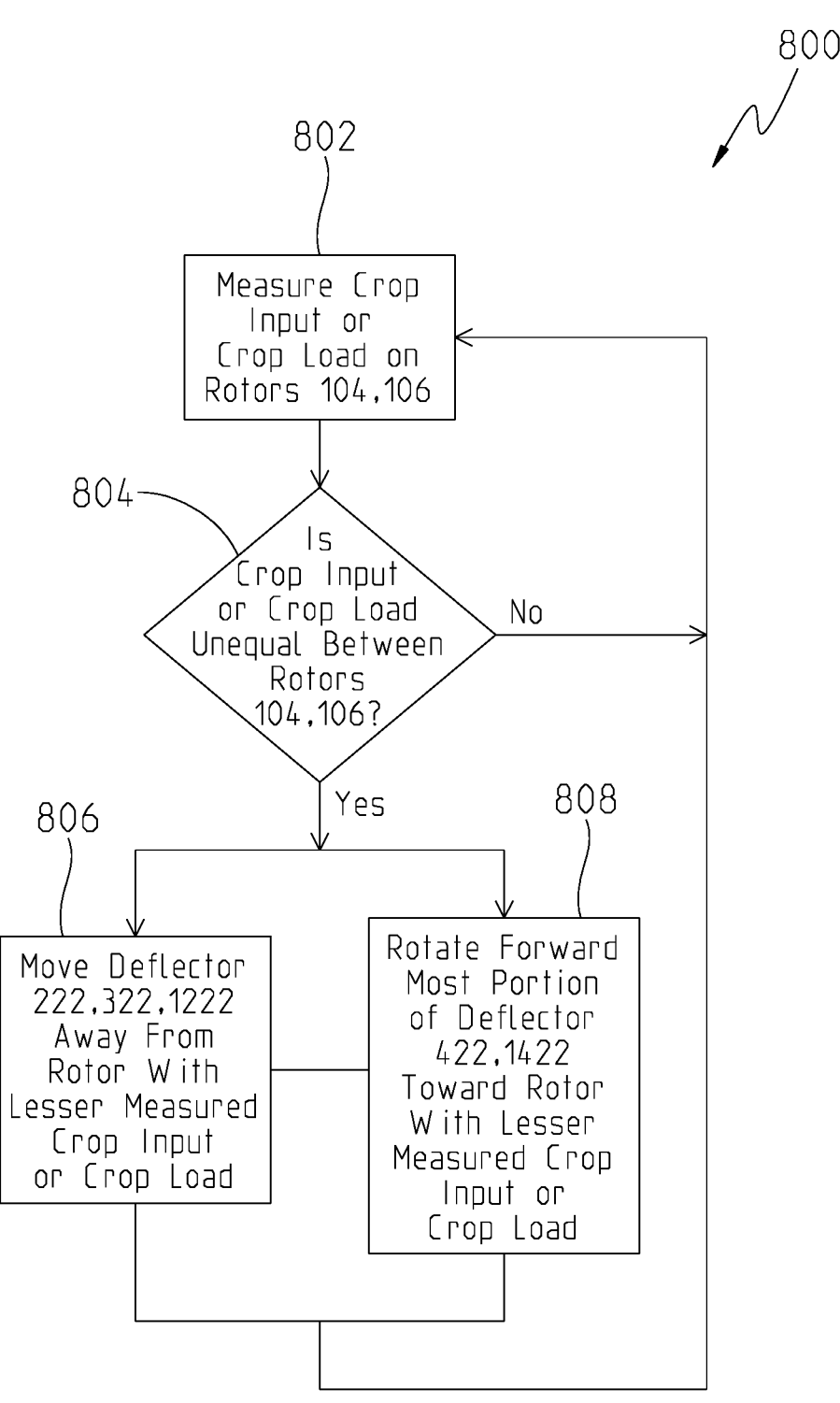
FIG. 8 is a flow chart of an example method of moving a deflector of an agricultural machine based on measured crop inputs to or crop loads on a first threshing rotor and a second threshing rotor of the agricultural machine.

FIG. 8 shows a flowchart of an example method 800 for moving a deflector of the agricultural machine 10. In some implementations, at 802, at least one sensor 506, 508 measures the crop input to the first threshing rotor 104 and the second threshing rotor 106 or the crop load on the first threshing rotor 104 and the second threshing rotor 106, each of which can be measured through different exemplary implementations described herein.

In some implementations, as shown at 802, the at least one sensor 506 measures a crop load or a parameter indicative of a crop load on the first threshing rotor 104 and the second threshing rotor 106.

Figure 12:
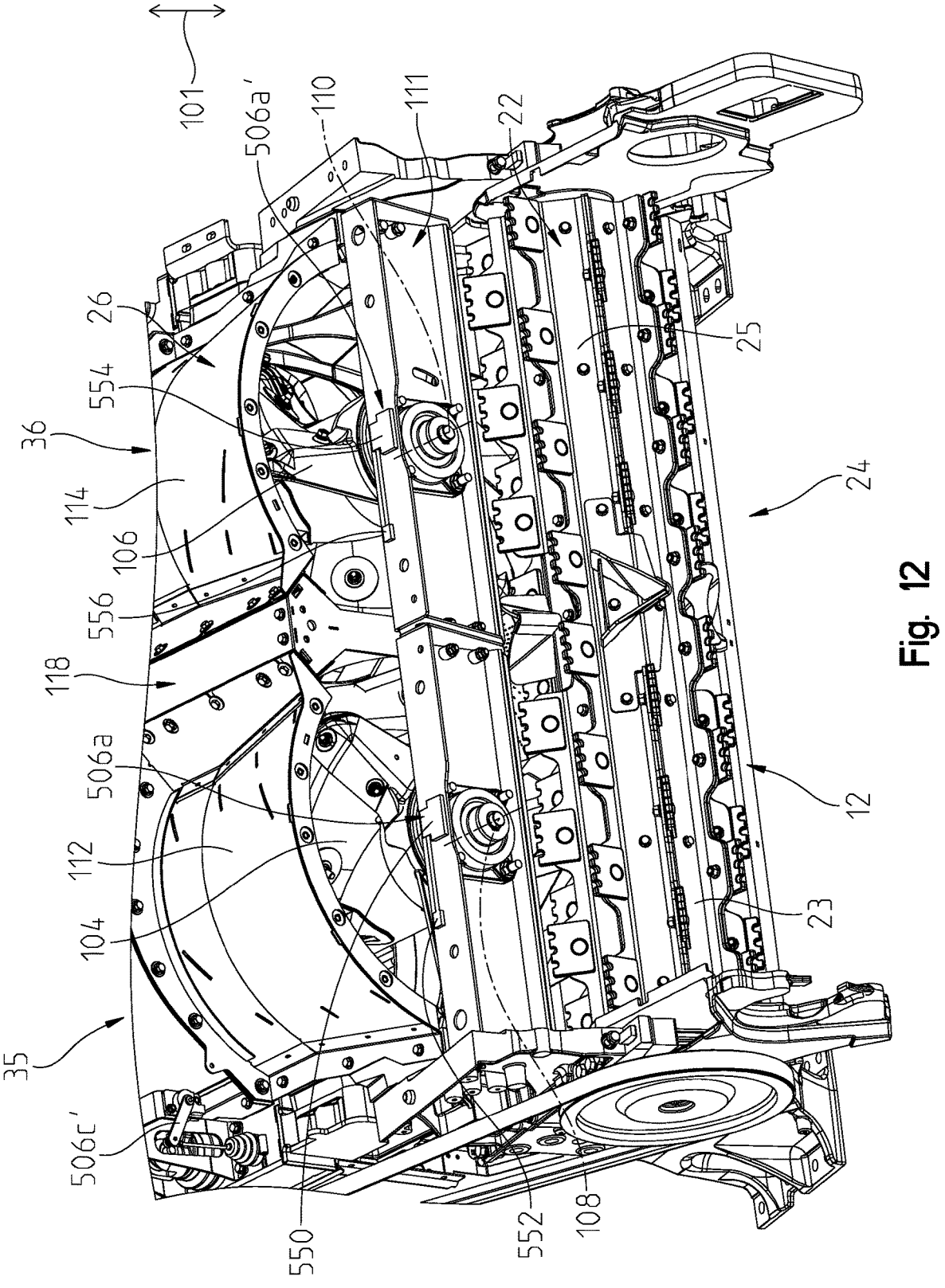
FIG. 12 is a front perspective view of the dual rotor threshing assembly and guide drum of FIG. 9 showing first and second sensors on a crossbar of a frame to which first and second threshing rotors are coupled.

As shown in FIG. 12, the at least one sensor 506 comprises a first sensor 506a and a second sensor 506a$^1$, and each sensor 506a, 506a$^1$ is configured to measure strain on different portions of the frame 12. In the illustrative implementation, the sensors 506a, 506a$^1$ are positioned on or otherwise coupled to a laterally extending crossbar 111 of the frame 12 to which front portions of the first and second threshing rotors 104, 106 are coupled. As shown in FIG. 12, the first threshing rotor 104 is coupled to the laterally extending crossbar 111 of the frame 12 via a first bearing that facilitates rotation of the first threshing rotor 104 about the first threshing axis 108, and the second threshing rotor 106 is coupled to the laterally extending crossbar 111 of the frame 12 via a second bearing that facilitates rotation of the second threshing rotor 106 about the second threshing axis 110. As shown in FIG. 12, in some implementations, the laterally extending crossbar 111 is comprised of a first side aligned with and positioned forward of the first rotor assembly 35 and a second side aligned with and positioned forward of the second rotor assembly 36.

In the illustrative implementation, as shown in FIG. 12, the first sensor 506a includes a first end 550 and a second end 552. The first end 550 of the first sensor 506a is aligned with the first threshing axis 108 and the second end 552 of the first sensor 506a is not aligned with the first threshing axis 108. Specifically, the first end 550 of the first sensor 506a is positioned directly above and in lateral alignment with the first threshing axis 108, as shown in FIG. 12.

As the crop load on the first threshing rotor 104 changes, deformation of the crossbar 111 correspondingly changes. For example, as the crop load increases, the first threshing rotor 104 may be urged forward causing a portion of the crossbar 111 that is aligned with the first threshing axis 108 to move relative to portions of the crossbar 111 not aligned with the first threshing axis 108. As such, the first sensor 506a measures the strain on the crossbar 111 based on the distance between the first side 550 of the first sensor 506a and the second side 552 of the first sensor 506a. As shown in FIG. 12, in the illustrative implementation, the portion of the crossbar 111 aligned with the first end 550 of the first sensor 506a includes a cut-out such that the strain on the crossbar 111 is focused on the portion of the crossbar 111 that is aligned with the first end 550 of the first sensor 506a, which allows the strain to be more easily measured. The measured strain on the crossbar 111 is a parameter indicative of crop load.

As shown in FIG. 12, the second sensor 506a$^1$ includes a first end 554 aligned with the second threshing axis 110 and a second end 556 that is not aligned with the second threshing axis 110. The second sensor 506a$^1$ is structured and functions the same as the first sensor 506a, to measure the strain on the crossbar 111, which is a parameter indicative of crop load. As shown in FIG. 12, strain may be focused on the portion of the crossbar 111 that is aligned with the first end 554 of the second sensor $506a^1$ (via a cut-out), allowing the strain on the crossbar 111 of the frame 12 to be more easily measured. As described in further detail herein, the controller 502 is operatively coupled to the first sensor 506a and the second sensor $506a^1$ and is configured to receive signals from the first sensor 506a and the second sensor $506a^1$ associated with the measured strain. The controller 502 is configured to determine whether one of the first threshing rotor 104 and the second threshing rotor 106 has a lesser crop load than the other of the first threshing rotor 104 and the second threshing rotor 106 based on the measured strain received from the first sensor 506a and the measured strain received from the second sensor $506a^1$.

As shown in FIG. 13, the at least one sensor 506 comprises a first sensor 506b and a second sensor $506b^1$, and each sensor 506b, $506b^1$ is configured to measure strain on different portions of the frame 12. In the illustrative implementation, the sensors 506b, $506b^1$ are positioned on or otherwise coupled to first and second brackets 113, 115 of the frame 12 that are arranged on opposite sides of the guide drum 22. As shown in FIG. 13, the guide drum 22 is coupled between the first bracket 113 of the frame 12 and the second bracket 115 of the frame 12 via bearings 558, 560 that facilitate rotation of the guide drum 22 relative to the frame 12. In the illustrative implementation, the first sensor 506b may include a first portion aligned with the bearing 558 and a second portion not aligned with the bearing 558. As shown in FIGS. 12 and 13, the guide drum 22 includes a first side 23 aligned with and configured to direct harvested crop to the first threshing rotor 104 and a second side 25 aligned with and configured to direct harvested crop to the second threshing rotor 106. As crop loads on the first and second sides 23, 25 of the guide drum 25 change, deformation of the brackets 113, 115, respectively, correspondingly changes. For example, as the crop load on the first side 23 of the guide drum increases, the first side 23 of the guide drum 22 may be urged forward causing deformation of the bracket 113 of the frame 12. Similarly, as the crop load on the second side 25 of the guide drum increases, the second side 25 of the guide drum 22 may be urged forward causing deformation of the bracket 115 of the frame 12.

Deformation of the brackets 113, 115 is measured as strain via the first and second sensors 506b, $506b^1$, respectively. Measured strain on the brackets 113, 115 is a parameter indicative of crop load. For example, measured strain on the bracket 113 is indicative of crop load on the first threshing rotor 104, and measured strain on the bracket 115 is indicative of crop load on the second threshing rotor 106. As described in further detail herein, the controller 502 is operatively coupled to the first and second sensors 506b, $506b^1$ and is configured to receive signals from the first and second sensors 506b, $506b^1$ associated with the measured strain. The controller 502 is configured to determine whether one of the first threshing rotor 104 and the second threshing rotor 106 has a lesser crop load than the other of the first threshing rotor 104 and the second threshing rotor 106 based on the measured strain received from the first sensor 506b and the measured strain received from the second sensor $506b^1$.

As shown in FIGS. 9 and 14, the at least one sensor 506 comprises a first sensor 506c, a second sensor $506c^1$, a third sensor $506c^{11}$, and a fourth sensor $506c^{111}$, and each sensor 506c, $506c^1$, $506c^{11}$, and $506c^{111}$ is configured to measure a position or change in position of a portion of the thresher basket 43. In the illustrative implementation, each sensor 506c, $506c^1$, $506c^{11}$, and $506c^{111}$ is a potentiometer. As shown in FIG. 14, the second and fourth sensors $506c^1$, $506c^{111}$ are coupled to the second rotor assembly 36 and configured to measure the position or change in position of the second side 107 of the thresher basket 43 relative to the second threshing rotor 106.

In the illustrative implementation, as shown in FIG. 14, the second and fourth sensors $506c^1$, $506c^{111}$ are coupled to respective pulleys each having first and second arms. The first arm of each pulley is coupled to the frame 12, and the second arm of each pulley is coupled to the second side 107 of the thresher basket 43. In the illustrative implementation, the second and fourth sensors $506c^1$, $506c^{111}$ are positioned at a pivoting connection points that couple together the first and second arms of the pulleys.

Harvested crop is processed by the second threshing rotor 106 in cooperation with the second side 107 of the thresher basket 43, and as the crop load on the second threshing rotor 106 changes, the distance between the second threshing rotor 106 and the second side 107 of the thresher basket 43 correspondingly changes to accommodate the change in crop load. Thus, position or change in position of the second side 107 of the thresher basket 43 relative to the second threshing rotor 106 is a parameter indicative of crop load on the second threshing rotor 106.

In the illustrative implementation, as shown in FIG. 9, the first and third sensors 506c, $506c^{11}$ are coupled to the first rotor assembly 35 and configured to measure the position or change in position of the first side 105 of the thresher basket 43 relative to the first threshing rotor 104. The first and third sensors 506c, $506c^{11}$ are structured and function the same as the second and fourth sensors $506c^1$, $506c^{111}$ to measure the position or change in position of the first side 105 of the thresher basket 43 relative to the first threshing rotor 104, which is a parameter indicative of crop load on the first threshing rotor 104. In the illustrative embodiment, the first side 105 of the thresher basket 43 is movable independently from the second side 107 of the thresher basket 43 as the crop loads vary between the first threshing rotor 104 and the second threshing rotor 106.

As described in further detail herein, the controller 502 is operatively coupled to the first, second, third, and fourth sensors 506c, $506c^1$, $506c^{11}$, $506c^{111}$ and configured to receive signals therefrom associated with the measured positions or changes in position described above. The controller 502 is configured to determine whether one of the first threshing rotor 104 and the second threshing rotor 106 has a lesser crop load than the other of the first threshing rotor 104 and the second threshing rotor 106 based on the measured position or change in position received from the first, second, third, and fourth sensors 506c, $506c^1$, $506c^{11}$, $506c^{111}$. In some implementations, the controller 502 is configured to compare a combination of the measured positions or changes in position received from the first and third sensors 506c, $506c^{11}$ to a combination of the measured positions or changes in position received from the second and fourth sensors $506c^1$, $506c^{111}$ to determine whether one of the first threshing rotor 104 and the second threshing rotor 106 has a lesser crop load than the other of the first threshing rotor 104 and the second threshing rotor 106.

As shown in FIGS. 9 and 14, the at least one sensor 506 comprises a first sensor 506d, a second sensor $506d^1$, a third sensor $506d^{11}$, and a fourth sensor $506d^{111}$, and each sensor 506d, $506d^1$, $506d^{11}$, and $506d^{111}$ is configured to measure the pressure of a respective cylinder assembly 562, 564, 566, 568. As shown in FIG. 14, the second and fourth sensors $506d^1$, $506d^{111}$ are configured to measure the pressure of the second and fourth cylinder assemblies 564, 568, respectively, which are coupled to the second rotor assembly 36. In shown in FIG. 14, the second and fourth cylinder assemblies 564, 568, each include a first end coupled to the frame 12 and a second end couple to the second side 107 of the thresher basket 43 for movement therewith.

Harvested crop is processed by the second threshing rotor 106 in cooperation with the second side 107 of the thresher basket 43, and as the crop load on the second threshing rotor 106 changes, the pressure of second and fourth cylinder assemblies 564, 568 correspondingly changes (as the second and fourth cylinder assemblies 564, 568 are forced to extend or retract) to accommodate the change in crop load on the second threshing rotor 106. Thus, pressure of the second and fourth cylinder assemblies 564, 568 is a parameter indicative of crop load on the second threshing rotor 106.

In the illustrative implementation, as shown in FIG. 9, the first and third sensors $506d$, $506d^{11}$ are configured to measure the pressure of the first and third cylinder assemblies 562, 566, respectively, which are coupled to the first rotor assembly 35. The first and third sensors $506c$, $506c^{11}$ are structured and function the same as the second and fourth sensors $506c^1$, $506c^{111}$ to measure the pressure of the first and third cylinder assemblies 562, 566, which is a parameter indicative of crop load on the first threshing rotor 104. In the illustrative embodiment, the first side 105 of the thresher basket 43 is movable independently from the second side 107 of the thresher basket 43 as the crop loads vary between the first threshing rotor 104 and the second threshing rotor 106.

As described in further detail herein, the controller 502 is operatively coupled to the first, second, third, and fourth sensors $506d$, $506d^1$, $506d^{11}$, $506d^{111}$ and configured to receive signals therefrom associated with the measured pressures described above. The controller 502 is configured to determine whether one of the first threshing rotor 104 and the second threshing rotor 106 has a lesser crop load than the other of the first threshing rotor 104 and the second threshing rotor 106 based on the measured pressures received from the first, second, third, and fourth sensors $506d$, $506d^1$, $506d^{11}$, $506d^{111}$. In some implementations, the controller 502 is configured to compare a combination of the measured pressures received from the first and third sensors $506d$, $506d^{11}$ to a combination of the measured pressures received from the second and fourth sensors $506d^1$, $506d^{111}$ to determine whether one of the first threshing rotor 104 and the second threshing rotor 106 has a lesser crop load than the other of the first threshing rotor 104 and the second threshing rotor 106.

At 804, the controller 502 receives the measured crop load or measured parameter indicative of crop load from the at least one sensor 506 and compares the measurements for the first threshing rotor 104 and the second threshing rotor 106. At 806 and 808, the controller 502 adjusts a deflector (e.g., by actuating one or more actuators operatively coupled to the controller 502), causing movement of the deflector. In some implementations, such those in which the deflector is positioned upstream of the first and second threshing rotors 104, 106, adjustment of the deflector causes additional harvested crop to be directed toward the rotor of the dual rotor threshing assembly 26 having a lesser crop load.

In some implementations, the at least one sensor 506 measures the torque of the first threshing rotor 104 and the second threshing rotor 106. In some implementations, the at least one sensor 506 measures a parameter indicative of torque of the first and second threshing rotors 104, 106, respectively, but does not measure the torque directly. For example, a fluid pressure, such a hydraulic or pneumatic pressure, that is used to drive the first or second threshing rotor 104, 106 can be measured, and the measured pressure can be used to determine the torque of the first or second threshing rotor 104, 106 via the controller 502. The torque (like the pressure, displacement, or strain) may reflect or be used as a proxy for the crop load on the first threshing rotor 104 and the second threshing rotor 106. In each example, the measured values for the first threshing rotor 104 and the second threshing rotor 106 are compared, and the adjustment is made accordingly by the controller 502, as described above.

In one example, as indicated at 806, if the first threshing rotor 104 is the rotor with a lesser crop load, then the controller 502 causes the actuator 228 to pivot the deflector 222 toward the second threshing rotor 106 to increase the amount of harvested crop directed to the first threshing rotor 104. In another example, as indicated at 806, if the first threshing rotor 104 is the rotor with a lesser crop load, then the controller 502 causes the actuator 1228 to pivot the deflector 1222 toward the second threshing rotor 106 to increase the amount of harvested crop directed to the first threshing rotor 104. In another example, as indicated at 806, if the first threshing rotor 104 is the rotor with lesser crop load, then the controller 502 causes the actuator 328 to slide the deflector 322 toward the second threshing rotor 106 to increase the amount of harvested crop directed to the first threshing rotor 104. In another example, as indicated at 808, if the first threshing rotor 104 is the rotor with lesser crop load, then the controller 502 causes the actuator 428 to rotate the deflector 422 clockwise in the direction of arrow 437 (as shown in the context of FIG. 5) to increase the amount of harvested crop directed to the first threshing rotor 104. In other words, at 808, the controller 502 causes the actuator 428 to rotate the deflector 422 in a direction such that an increased amount of harvested crop is directed toward the rotor with lesser crop load. In another example, as indicated at 808, if the first threshing rotor 104 is the rotor with lesser crop load, then the controller 502 causes the actuator 1428 to rotate the deflector 1422 clockwise in the direction of arrow 1437 (as shown in the context of FIG. 11) to increase the amount of harvested crop directed to the first threshing rotor 104. In other words, at 808, the controller 502 causes the actuator (e.g., 428, 1428) to rotate the deflector (e.g., 422, 1422) in a direction such that an increased amount of harvested crop is directed toward the threshing rotor with lesser crop load. In each of these examples, movement of the respective deflector 222, 322, 422, 1222, 1422 increases the amount of harvested crop directed toward the threshing rotor with the lesser crop load.

In some implementations, as indicate at 802, the at least one sensor 508 measures the crop input to the first threshing rotor 104 and the second threshing rotor 106. As indicated at 804, the controller 502 receives a crop input measurement from the at least one sensor 508 and compares the measured crop inputs for the first threshing rotor 104 and the second threshing rotor 106. At 806 and 808, the controller 502 adjusts the deflector (e.g., via actuation of an actuator that is operatively coupled to the deflector), causing movement of the deflector such that additional harvested crop is directed toward the rotor having a lesser crop input. In some implementations, the at least one sensor 508 may measure, visually, the crop input to each rotor 104, 106. In some implementations, the at least one sensor 508 may be, for example, a camera. The visually measured crop inputs are compared, and the adjustment is made accordingly by the controller 502, as described above.

In one example, as indicated at 806, if the first threshing rotor 104 is the rotor with lesser measured crop input, then the controller 502 causes the actuator 228 to pivot the deflector 222 toward the second threshing rotor 106 to increase the amount of harvested crop directed to the first threshing rotor 104. In another example, as indicated at 806, if the first threshing rotor 104 is the rotor with lesser measured crop input, then the controller 502 causes the actuator 1228 to pivot the deflector 1222 toward the second threshing rotor 106 to increase the amount of harvested crop directed to the first threshing rotor 104. In another example, at 806, if the first threshing rotor 104 is the rotor with lesser measured crop input, then the controller 502 causes the actuator 328 to slide the deflector 322 toward the second threshing rotor 106 to increase the amount of harvested crop directed to the first threshing rotor 104. In another example, at 808, if the first threshing rotor 104 is the rotor with lesser measured crop input, then the controller 502 causes the actuator 428 to rotate the deflector 422 clockwise in the direction of arrow 437 (as shown in the context of FIG. 5) to increase the amount of harvested crop directed to the first threshing rotor 104. In another example, at 808, if the first threshing rotor 104 is the rotor with lesser measured crop input, then the controller 502 causes the actuator 1428 to rotate the deflector 1422 clockwise in the direction of arrow 1437 (as shown in the context of FIG. 11) to increase the amount of harvested crop directed to the first threshing rotor 104. In other words, at 808, the controller 502 causes the actuator (e.g., 428, 1428) to rotate the deflector (e.g., 422, 1422) in a direction such that an increased amount of harvested crop is directed toward the rotor with lesser measured crop input. In each of these examples, movement of the respective deflector 222, 322, 422, 1222, 1422 increases the amount of harvested crop directed toward the rotor with lesser measured crop input.

The methods described herein may be broadly considered processes for balancing or otherwise redistributing the crop load on, crop input to, crop processed by, or crop output from the first threshing rotor 104 and the second threshing rotor 106. Such processes may occur automatically, via execution by the controller 502, in response to signals received by the sensors 504, 506, 508, without user intervention. However, in some implementations, a user may input instructions to the user interface 512, which sends a signal to the controller 502 indicative of the instructions. In response, the controller 502 adjusts an actuator (e.g., 228, 328, 428, 1228, 1428) operatively coupled thereto causing movement of a respective deflector (e.g., 222, 322, 422, 1222, 1422). Thus, in response to input from the user interface 512, the deflectors 222, 322, 422, 1222, 1422 are configured to increase the amount of harvested crop directed toward the first threshing rotor 104 or the second threshing rotor 106.

While the disclosure has been illustrated and described in detail in the drawings and foregoing description, such illustration and description are to be considered as exemplary and not restrictive in character, it being understood that illustrative implementation(s) have been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. An agricultural machine for processing harvested crop comprising:
   a dual rotor threshing assembly including a first threshing rotor and a second threshing rotor positioned adjacent to the first threshing rotor, wherein each of the first threshing rotor and the second threshing rotor are configured to rotate to process the harvested crop;
   a first sensor and a second sensor each configured to measure a parameter indicative of crop load; and
   a controller operatively coupled to the first sensor and the second sensor and configured to receive signals from the first sensor and the second sensor associated with the measured parameter;
   wherein the first sensor is configured to measure the parameter indicative of crop load on the first threshing rotor;
   wherein the second sensor is configured to measure the parameter indicative of crop load on the second threshing rotor;
   wherein the controller is configured to determine whether one of the first threshing rotor and the second threshing rotor has a lesser crop load than the other of the first threshing rotor and the second threshing rotor based on the signals associated with the measured parameter received from the first sensor and the second sensor; and
   wherein the controller is configured to, during operation of both the first and second threshing rotors, and in response to determining that one of the first threshing rotor and the second threshing rotor has a lesser crop load than the other of the first threshing rotor and the second threshing rotor, facilitate a displacement of a deflector to change a distribution of harvested crop between the first threshing rotor and the second threshing rotor.

2. The agricultural machine of claim 1, further comprising a frame to which the first threshing rotor and the second threshing rotor are coupled;
   wherein the first threshing rotor and the second threshing rotor are configured to rotate relative to the frame to process the harvested crop.

3. The agricultural machine of claim 2, wherein the first sensor and the second sensor are configured to measure strain on the frame.

4. The agricultural machine of claim 3, wherein the first threshing rotor is coupled to a laterally extending crossbar of the frame via a first bearing that facilitates rotation of the first threshing rotor about a first axis;
   wherein the second threshing rotor is coupled to the laterally extending crossbar of the frame via a second bearing that facilitates rotation of the second threshing rotor about a second axis; and
   wherein the first sensor and the second sensor are each coupled to the laterally extending crossbar.

5. The agricultural machine of claim 4, wherein a portion of the first sensor is aligned with the first axis; and
   wherein a portion of the second sensor is aligned with the second axis.

6. The agricultural machine of claim 3, further comprising:
   a guide drum configured to rotate relative to the frame to direct harvested crop to the first threshing rotor and the second threshing rotor;

wherein the guide drum is coupled between a first bracket of the frame and a second bracket of the frame.

7. The agricultural machine of claim 6, wherein the first sensor is coupled to the first bracket and the second sensor is coupled to the second bracket.

8. The agricultural machine of claim 1, further comprising a threshing basket including:

a first side movable relative to the first threshing rotor and configured to process the harvested crop in cooperation with the first threshing rotor; and a second side movable, independently of the first side, relative to the second threshing rotor and configured to process the harvested crop in cooperation with the second threshing rotor.

9. The agricultural machine of claim 8, wherein the first sensor is configured to measure a position or change in position of the first side of the threshing basket relative to the first threshing rotor; and wherein the second sensor is configured to measure a position or change in position of the second side of the threshing basket relative to the second threshing rotor.

10. The agricultural machine of claim 9, wherein at least one of the first sensor and the second sensor is a potentiometer.

11. The agricultural machine of claim 1, wherein the controller is configured to cause movement of a deflector that engages with the harvested crop to change the distribution of harvested crop between the first threshing rotor and the second threshing rotor.

12. The agricultural machine of claim 11, wherein the deflector is positioned upstream of the first threshing rotor and the second threshing rotor.

13. An agricultural machine for processing harvested crop comprising:

a dual rotor threshing assembly including a first threshing rotor and a second threshing rotor positioned adjacent to the first threshing rotor, wherein each of the first threshing rotor and the second threshing rotor are configured to rotate to process the harvested crop;

a first sensor and a second sensor each configured to measure a parameter indicative of crop load; and a controller operatively coupled to the first sensor and the second sensor and configured to receive signals from the first sensor and the second sensor associated with the measured parameter;

a frame to which the first threshing rotor and the second threshing rotor are coupled;

a threshing basket including a first side movable relative to the first threshing rotor and configured to process the harvested crop in cooperation with the first threshing rotor, and a second side movable, independently of the first side, relative to the second threshing rotor and configured to process the harvested crop in cooperation with the second threshing rotor;

a first cylinder assembly that is coupled to the frame, coupled to the first side of the threshing basket, and configured to extend and retract with movement of the first side of the threshing basket; and a second cylinder assembly that is coupled to the frame, coupled to the second side of the threshing basket, and configured to extend and retract with movement of the second side of the threshing basket; and wherein the first sensor is configured to measure pressure in the first cylinder assembly and the second sensor is configured to measure pressure in the second cylinder assembly, wherein the first sensor is configured to measure the parameter indicative of crop load on the first threshing rotor;

wherein the second sensor is configured to measure the parameter indicative of crop load on the second threshing rotor;

wherein the controller is configured to determine whether one of the first threshing rotor and the second threshing rotor has a lesser crop load than the other of the first threshing rotor and the second threshing rotor based on the signals associated with the measured parameter received from the first sensor and the second sensor; and wherein the controller is configured to change a distribution of harvested crop between the first threshing rotor and the second threshing rotor in response to determining that one of the first threshing rotor and the second threshing rotor has a lesser crop load than the other of the first threshing rotor and the second threshing rotor.

14. A method associated with processing harvested crop via an agricultural machine, the method comprising:

rotating a first threshing rotor and a second threshing rotor positioned adjacent to the first threshing rotor to process the harvested crop;

measuring, via a first sensor, a parameter indicative of crop load on the first threshing rotor;

measuring, via a second sensor, the parameter indicative of crop load on the second threshing rotor;

receiving, via a controller, the measured parameter from the first sensor and from the second sensor;

determining, via the controller, whether one of the first threshing rotor and the second threshing rotor has a lesser crop load than the other of the first threshing rotor and the second threshing rotor based on the measured parameter received from the first sensor and from the second sensor; and changing, during operation of both the first and second threshing rotors, a distribution of harvested crop between the first threshing rotor and the second threshing rotor in response to determining that one of the first threshing rotor and the second threshing rotor has a lesser crop load than the other of the first threshing rotor and the second threshing rotor.

15. The method of claim 14, wherein measuring the parameter indicative of the crop load includes measuring pressure.

16. The method of claim 14, wherein measuring the parameter indicative of the crop load includes measuring strain.

17. A method associated with processing harvested crop via an agricultural machine, the method comprising:

rotating a first threshing rotor and a second threshing rotor positioned adjacent to the first threshing rotor to process the harvested crop;

measuring, via a first sensor, a parameter indicative of crop load on the first threshing rotor;

measuring, via a second sensor, the parameter indicative of crop load on the second threshing rotor;

receiving, via a controller, the measured parameter from the first sensor and from the second sensor;

determining, via the controller, whether one of the first threshing rotor and the second threshing rotor has a lesser crop load than the other of the first threshing rotor and the second threshing rotor based on the measured parameter received from the first sensor and from the second sensor; and

changing a distribution of harvested crop between the first threshing rotor and the second threshing rotor in response to determining that one of the first threshing rotor and the second threshing rotor has a lesser crop load than the other of the first threshing rotor and the second threshing rotor, and wherein measuring the parameter indicative of the crop load includes measuring a position or change in position of first and second sides of a thresher basket that cooperates with the first threshing rotor and the second threshing rotor to process the harvested crop.

18. An agricultural machine for processing harvested crop comprising:

a dual rotor threshing assembly including a first threshing rotor and a second threshing rotor positioned adjacent to the first threshing rotor, wherein each of the first threshing rotor and the second threshing rotor are configured to rotate to process the harvested crop;

a guide drum configured to rotate relative to a frame to direct harvested crop downstream to the first threshing rotor and the second threshing rotor;

24 a first sensor and a second sensor each configured to measure a parameter indicative of crop load; and a controller operatively coupled to the first sensor and the second sensor and configured to receive signals from the first sensor and the second sensor associated with the measured parameter;

wherein the first sensor is configured to measure the parameter indicative of crop load on the first threshing rotor;

wherein the second sensor is configured to measure the parameter indicative of crop load on the second threshing rotor; and wherein the controller is configured to, during operation of both the first and second threshing rotors, change a distribution of harvested crop based on the signals associated with the measured parameter received from the first sensor and the second sensor.

* * * * *